United States Patent
Nam et al.

(10) Patent No.: US 11,848,874 B2
(45) Date of Patent: Dec. 19, 2023

(54) VIRTUAL SEARCH SPACES FOR BEAM INDICATION

(71) Applicant: QUALCOMM Incorporated, San Diego, CA (US)

(72) Inventors: Wooseok Nam, San Diego, CA (US); Sony Akkarakaran, Poway, CA (US); Tao Luo, San Diego, CA (US); Xiao Feng Wang, San Diego, CA (US); Makesh Pravin John Wilson, San Diego, CA (US); Sumeeth Nagaraja, Los Altos, CA (US); Shengbo Chen, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/343,594

(22) Filed: Jun. 9, 2021

(65) Prior Publication Data

US 2021/0306118 A1    Sep. 30, 2021

Related U.S. Application Data

(62) Division of application No. 16/267,298, filed on Feb. 4, 2019, now Pat. No. 11,057,166.

(Continued)

(51) Int. Cl.
*H04W 4/00* (2018.01)
*H04L 5/00* (2006.01)
(Continued)

(52) U.S. Cl.
CPC .......... *H04L 5/0005* (2013.01); *H04L 1/0045* (2013.01); *H04L 1/0047* (2013.01);
(Continued)

(58) Field of Classification Search
CPC ... H04L 5/0005; H04L 1/0045; H04L 1/0047; H04L 1/0072; H04L 5/0023;
(Continued)

(56) References Cited

U.S. PATENT DOCUMENTS 9,445,409 B2    9/2016  Liao et al.
10,708,942 B2 *  7/2020  Lee .................... H04W 72/23
(Continued)

FOREIGN PATENT DOCUMENTS

CA          2765513 A1    12/2010
CN        101998526 A     3/2011
(Continued)

OTHER PUBLICATIONS

Taiwan Search Report—TW108104393—TIPO—dated Nov. 30, 2022.
(Continued)

*Primary Examiner* — Chuong T Ho
(74) *Attorney, Agent, or Firm* — Holland & Hart LLP

(57) ABSTRACT

Methods, systems, and devices for wireless communications are described. A base station may identify time and frequency resources for a physical downlink shared channel (PDSCH) to be transmitted to a user equipment (UE) in a first transmission time interval (TTI). The base station may transmit configuration information for a control channel search space set in a second TTI. The second TTI may precede the first TTI. The configuration information may include an indication of an absence of a physical downlink control channel (PDCCH) transmission to send in the control channel search space set indicating the identified time and frequency resources for the PDSCH, and a set of time and frequency resources for the control channel search space set. The UE may receive the configuration information and identify the time and frequency resources allocated for the
(Continued)

PDSCH in the second TTI, and receive the PDSCH transmission in the second TTI.

26 Claims, 19 Drawing Sheets

Related U.S. Application Data

(60) Provisional application No. 62/710,486, filed on Feb. 16, 2018.

(51) Int. Cl.
| | |
|---|---|
| *H04L 25/02* | (2006.01) |
| *H04L 27/00* | (2006.01) |
| *H04L 27/26* | (2006.01) |
| *H04L 1/00* | (2006.01) |

(52) U.S. Cl.
CPC .......... *H04L 1/0072* (2013.01); *H04L 5/0023* (2013.01); *H04L 5/0044* (2013.01); *H04L 5/0091* (2013.01); *H04L 25/0238* (2013.01); *H04L 25/0258* (2013.01); *H04L 27/0014* (2013.01); *H04L 27/2676* (2013.01); *H04L 5/0053* (2013.01); *H04L 2027/0026* (2013.01)

(58) Field of Classification Search
CPC . H04L 5/0044; H04L 5/0091; H04L 25/0238; H04L 25/0258; H04L 27/0014; H04L 27/2676; H04L 5/0053; H04L 2027/0026; H04L 1/0038; H04B 17/373; H04W 72/1273; H04W 72/23
USPC ................................................ 370/329, 330
See application file for complete search history.

(56) References Cited

U.S. PATENT DOCUMENTS

| | | | |
|---|---|---|---|
| 11,139,941 | B2 | 10/2021 | Akkarakaran et al. |
| 2015/0036560 | A1 | 2/2015 | Kim et al. |
| 2017/0359826 | A1 | 12/2017 | Islam et al. |
| 2018/0084561 | A1 | 3/2018 | Liu et al. |
| 2018/0123769 | A1* | 5/2018 | Pelletier ................. H04L 5/001 |
| 2018/0279223 | A1 | 9/2018 | Kim et al. |
| 2019/0020506 | A1 | 1/2019 | Cheng et al. |
| 2019/0045394 | A1* | 2/2019 | Takano ................. H04W 72/04 |
| 2019/0174466 | A1 | 6/2019 | Zhang et al. |
| 2019/0229792 | A1 | 7/2019 | Wilson et al. |
| 2019/0230545 | A1 | 7/2019 | Liou et al. |
| 2019/0260524 | A1 | 8/2019 | Nam et al. |
| 2019/0268208 | A1* | 8/2019 | Seo ..................... H04L 27/2657 |
| 2019/0306737 | A1 | 10/2019 | Kwak et al. |
| 2019/0387550 | A1* | 12/2019 | Pan .................. H04W 74/0833 |
| 2020/0077395 | A1 | 3/2020 | Guo |
| 2020/0128578 | A1 | 4/2020 | Park et al. |

FOREIGN PATENT DOCUMENTS

| | | |
|---|---|---|
| CN | 103889039 A | 6/2014 |
| CN | 104521272 A | 4/2015 |
| CN | 106160979 A | 11/2016 |
| TW | 201735694 A | 10/2017 |
| WO | WO-2010124444 A1 | 11/2010 |
| WO | WO-2013165216 A1 | 11/2013 |
| WO | WO-2017065666 A1 | 4/2017 |
| WO | WO-2017133212 A1 | 8/2017 |
| WO | WO-2018031623 A1 | 2/2018 |
| WO | WO-2019051485 A1 | 3/2019 |

OTHER PUBLICATIONS

Ericsson: "On Remaining Issues for Search Space and Blind Decoding", 3GPP TSG RAN WG1 Meeting #91, 3GPP Draft; R1-1720993, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017 (Nov. 18, 2017), 12 Pages, XP051370356, Retrieved from the Internet: URL: http://www.3gpp.org/ftp/tsg%5Fran/WG1%5FRL1/TSGR1%5F91/Docs/ [retrieved on Nov. 18, 2017] the whole document.
Intel Corporation: "CORESETs and Search Spaces in NR", 3GPP TSG RAN WG1 #91bis, 3GPP Draft; R1-1717379 CORESETs and Search Space, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 3, 2017 (Oct. 3, 2017), pp. 1-11, XP051352602, Retrieved from the Internet: URL: http://www.3gpp.org/ftp/tsg_ran/WG1_RL1/TSGR1_90b/Docs/ [retrieved on Oct. 3, 2017] Sections 2 and 4.
International Preliminary Report on Patentability—PCT/US2019/016693, the International Bureau of WIPO—Geneva, Switzerland, dated Aug. 27, 2020.
International Search Report and Written Opinion—PCT/US2019/016693—ISA/EPO—dated May 8, 2019.
NTT Docomo Inc: "Status Report of WI on New Radio (NR) Access Technology, TSG RAN WG1", 3GPP TSG RAN Meeting #76, RP-171137, West Palm Beach, USA, Jun. 5-8, 2017, 118 Pages, May 29, 2017.
ETRI: "PDCCH Design for Multi-Beam Operation", 3GPP TSG RAN WG1 Meeting #91, 3GPP Draft; R1-1720231 PDCCH Design for Multi-Beam Operation—Final, 3rd Generation Partnership Project (3GPP), Mobile Competence Centre; 650, Route Des Lucioles; F-06921 Sophia-Antipolis Cedex ; France, vol. RAN WG1, No. Reno, USA; Nov. 27, 2017-Dec. 1, 2017, Nov. 18, 2017 (Nov. 18, 2017), pp. 1-6, XP051369867.

* cited by examiner

VIRTUAL SEARCH SPACES FOR BEAM INDICATION

CROSS REFERENCES

The present Application for Patent is a Divisional of U.S. patent application Ser. No. 16/267,298 by Nam, et al., entitled, "VIRTUAL SEARCH SPACES FOR BEAM INDICATION" filed Feb. 4, 2019, which claims the benefit of U.S. Provisional Patent Application No. 62/710,486 by NAM, et al., entitled "VIRTUAL SEARCH SPACES FOR BEAM INDICATION," filed Feb. 16, 2018, assigned to the assignee hereof, and expressly incorporated by reference in its entirety.

BACKGROUND

The following relates generally to wireless communication, and more specifically to virtual search space sets for beam indication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station may send control transmissions (e.g., downlink control information (DCI) via a physical downlink control channel (PDCCH) to the UE. The UE may be configured to monitor a PDCCH within a search space set, which may include multiple search candidates. For instance, each search space set may be associated with one or more control resource sets (coresets) containing multiple control channel elements (CCEs). The UE may be configured to monitor one or more search candidates in the search space set, and may blindly decode the one or more CCEs of the search candidate to receive the control information.

SUMMARY

The described techniques relate to improved methods, systems, devices, or apparatuses that support virtual search space sets for beam indication. In some wireless communications systems, a base station may configure and provide a search space configuration. The base station may transmit control information to a user equipment (UE) within a configured search space set. The search space set may be associated with one or more control resource sets (coresets) containing multiple control channel elements (CCEs). The base station may transmit the control information in search candidates (e.g., physical downlink control channel (PDCCH) candidates) on different aggregation levels within the coresets. In some cases, the base station may additionally transmit an indication of the search space configuration to the UE. The UE may monitor for a channel (e.g., a PDCCH) carrying downlink control information (DCI) from the base station according to the search space configuration.

The UE may detect and decode the DCI within the search candidates in the search space set. In some cases, the UE may receive transmissions from the base station according to the search space configuration and scheduling information. The DCI may include scheduling information, e.g., resource allocations for transmitting from the base station (and receiving at the UE) a downlink data transmission (e.g., on a physical downlink shared channel (PDSCH)). In some cases, the UE may receive the PDCCH on a first beam during a first transmission time interval (TTI) and the PDSCH on the same beam during a second TTI based on the search space configuration and scheduling information. In some cases, the UE may recognize that certain criteria have not been met (e.g., the time offset from the PDCCH to the PDSCH is less than a threshold number of TTIs) and use a beam of a default configuration, which may be a second beam different than the first beam. The search space configuration used by the UE may be a virtual search space set or a normal search space set. A number of actually transmitted PDCCH may be zero for the virtual search space set and/or the normal search space set. In some cases, the virtual search space set may additionally, or alternatively, have indicated (e.g., by a configuration indication) that a number of candidate PDCCHs is zero. As such, the UE may refrain from performing (e.g., by not performing) blind decoding during a TTI associated with the virtual search space set. The UE may also use the indicated coreset (e.g., time and frequency resources) associated with the virtual search space set as the coreset/time and frequency resources for receiving the PDSCH.

A method of wireless communication is described. The method may include receiving, from a base station, configuration information for a control channel search space set in a first TTI, the received configuration information including an indication of an absence of a PDCCH transmission in the control channel search space set, and a set of time and frequency resources for the control channel search space set, identifying time and frequency resources allocated for a PDSCH in a second TTI based on the set of time and frequency resources for the control channel search space set in the first TTI and the indication of the absence of a PDCCH transmission in the control channel search space set, and receiving a PDSCH transmission in the second TTI using the identified time and frequency resources.

An apparatus for wireless communication is described. The apparatus may include a processor, memory in electronic communication with the processor, and instructions stored in the memory. The instructions may be executable by the processor to cause the apparatus to receive, from a base station, configuration information for a control channel search space set in a first TTI, the received configuration information including an indication of an absence of a PDCCH transmission in the control channel search space set, and a set of time and frequency resources for the control channel search space set, identify time and frequency resources allocated for a PDSCH in a second TTI based on the set of time and frequency resources for the control channel search space set in the first TTI and the indication of the absence of a PDCCH transmission in the control channel search space set, and receive a PDSCH transmission in the second TTI using the identified time and frequency resources.

Another apparatus for wireless communication is described. The apparatus may include means for receiving, from a base station, configuration information for a control channel search space set in a first TTI, the received configuration information including an indication of an absence of a PDCCH transmission in the control channel search space set, and a set of time and frequency resources for the control channel search space set, identifying time and frequency resources allocated for a PDSCH in a second TTI based on the set of time and frequency resources for the control channel search space set in the first TTI and the indication of the absence of a PDCCH transmission in the control channel search space set, and receiving a PDSCH transmission in the second TTI using the identified time and frequency resources.

A non-transitory computer-readable medium storing code for wireless communication is described. The code may include instructions executable by a processor to receive, from a base station, configuration information for a control channel search space set in a first TTI, the received configuration information including an indication of an absence of a PDCCH transmission in the control channel search space set, and a set of time and frequency resources for the control channel search space set, identify time and frequency resources allocated for a PDSCH in a second TTI based on the set of time and frequency resources for the control channel search space set in the first TTI and the indication of the absence of a PDCCH transmission in the control channel search space set, and receive a PDSCH transmission in the second TTI using the identified time and frequency resources.

Some examples of the method, apparatuses, and non-transitory computer-readable medium described herein may further include operations, features, means, or instructions for refraining from performing blind decoding in the control channel search space set based on receiving the indication of the absence of the PDCCH transmission.

In some examples of the method, apparatuses, and non-transitory computer-readable medium described herein, the configuration information for the control channel search space set may be received in radio resource control signaling.

In some examples of the method, apparatuses, and non-transitory computer-readable medium described herein, the configuration information includes a control resource set configuration from the base station, a transmission configuration indication (TCI) state, and the time and frequency resources corresponding to resources of the control resource set configuration.

Some examples of the method, apparatuses, and non-transitory computer-readable medium described herein may further include operations, features, means, or instructions for receiving, in a field of a DCI, a transmission configuration indication (TCI) state, where the TCI state includes a spatial quasi-collocation (QCL) parameter for a beam indication.

Some examples of the method, apparatuses, and non-transitory computer-readable medium described herein may further include operations, features, means, or instructions for receiving, in a field of a DCI, a transmission configuration indication (TCI) state, and receiving, based on a scheduling offset of the PDSCH transmission being greater than or equal to a threshold value, the PDSCH transmission in the identified time and frequency resources using a beam associated with the received TCI state.

Some examples of the method, apparatuses, and non-transitory computer-readable medium described herein may further include operations, features, means, or instructions for receiving, in a field of a DCI, a first transmission configuration indication (TCI) state, and receiving, based on a scheduling offset of the PDSCH transmission being less than or equal to a threshold value, the PDSCH transmission in the identified time and frequency resources using a first beam associated with a second TCI state, the first beam different from a second beam associated with the first TCI state, and the second TCI state of a control resource set associated with the control channel search space set.

In some examples of the method, apparatuses, and non-transitory computer-readable medium described herein, the control channel search space set associated with a control resource set includes a zero number of PDCCH candidates.

A method of wireless communication is described. The method may include identifying time and frequency resources for a PDSCH to be transmitted to a UE in a first TTI, transmitting, to the UE, configuration information for a control channel search space set in a second TTI, the second TTI preceding the first TTI, and the configuration information including an indication of an absence of a PDCCH transmission to be sent in the control channel search space set to indicate the identified time and frequency resources for the PDSCH, and a set of time and frequency resources for the control channel search space set, and transmitting a PDSCH transmission in the first TTI using the identified time and frequency resources for the PDSCH.

An apparatus for wireless communication is described. The apparatus may include a processor, memory in electronic communication with the processor, and instructions stored in the memory. The instructions may be executable by the processor to cause the apparatus to identify time and frequency resources for a PDSCH to be transmitted to a UE in a first TTI, transmit, to the UE, configuration information for a control channel search space set in a second TTI, the second TTI preceding the first TTI, and the configuration information including an indication of an absence of a PDCCH transmission to be sent in the control channel search space set to indicate the identified time and frequency resources for the PDSCH, and a set of time and frequency resources for the control channel search space set, and transmit a PDSCH transmission in the first TTI using the identified time and frequency resources for the PDSCH.

Another apparatus for wireless communication is described. The apparatus may include means for identifying time and frequency resources for a PDSCH to be transmitted to a UE in a first TTI, transmitting, to the UE, configuration information for a control channel search space set in a second TTI, the second TTI preceding the first TTI, and the configuration information including an indication of an absence of a PDCCH transmission to be sent in the control channel search space set to indicate the identified time and frequency resources for the PDSCH, and a set of time and frequency resources for the control channel search space set, and transmitting a PDSCH transmission in the first TTI using the identified time and frequency resources for the PDSCH.

A non-transitory computer-readable medium storing code for wireless communication at is described. The code may include instructions executable by a processor to identify time and frequency resources for a PDSCH to be transmitted to a UE in a first TTI, transmit, to the UE, configuration information for a control channel search space set in a second TTI, the second TTI preceding the first TTI, and the configuration information including an indication of an absence of a PDCCH transmission to be sent in the control channel search space set to indicate the identified time and frequency resources for the PDSCH, and a set of time and frequency resources for the control channel search space set, and transmit a PDSCH transmission in the first TTI using the identified time and frequency resources for the PDSCH.

Some examples of the method, apparatuses, and non-transitory computer-readable medium described herein may further include operations, features, means, or instructions for transmitting the configuration information for the control channel search space set using radio resource control signaling.

In some examples of the method, apparatuses, and non-transitory computer-readable medium described herein, the configuration information includes a control resource set configuration, a transmission configuration indication (TCI) state, and the time and frequency resources corresponding to resources of the control resource set configuration.

Some examples of the method, apparatuses, and non-transitory computer-readable medium described herein may further include operations, features, means, or instructions for transmitting, in a field of a DCI, a transmission configuration indication (TCI) state, where the TCI state includes a spatial quasi-collocation (QCL) parameter for a beam indication.

Some examples of the method, apparatuses, and non-transitory computer-readable medium described herein may further include operations, features, means, or instructions for transmitting, in a field of a DCI, a transmission configuration indication (TCI) state, and transmitting, based on a scheduling offset of the PDSCH transmission being greater than or equal to a threshold value, the PDSCH transmission in the identified time and frequency resources using a beam associated with the transmitted TCI state.

Some examples of the method, apparatuses, and non-transitory computer-readable medium described herein may further include operations, features, means, or instructions for transmitting, in a field of a DCI, a first transmission configuration indication (TCI) state, and transmitting, based on a scheduling offset of the PDSCH transmission being less than or equal to a threshold value, the PDSCH transmission in the identified time and frequency resources using a first beam associated with a second TCI state, the first beam different from a second beam associated with the first TCI state, and the second TCI state of a control resource set associated with the control channel search space set.

In some examples of the method, apparatuses, and non-transitory computer-readable medium described herein, the control channel search space set associated with a control resource set includes a zero number of PDCCH candidates.

DETAILED DESCRIPTION

A base station may transmit control information to a user equipment (UE) within a configured search space set. The search space set may include one or more control resource sets (coresets) containing multiple control channel elements (CCEs). The base station may transmit the control information in search candidates (e.g., physical downlink control channel (PDCCH) candidates) on different aggregation levels within the coresets. In some cases, the base station may additionally transmit an indication of the search space configuration to the UE. The UE may monitor a channel (e.g., a PDCCH) for downlink control information (DCI) from the base station according to the search space configuration.

The UE may detect and decode the control information within the search candidates. In some cases, the UE may receive transmissions from the base station according to the search space configuration. The DCI may include schedule and resource allocations for transmitting from the base station (and receiving at the UE) a downlink data transmission (e.g., on a physical downlink shared channel (PDSCH)). In some cases, the UE may receive the PDCCH on a first beam during a first transmission time interval (TTI) and the PDSCH on a second beam during a second TTI based on the search space configuration. The search space configuration may be associated with a virtual search space set (corresponding to zero PDCCH candidates configured to be in the search space set) or a normal search space set (corresponding to one or more PDCCH candidates configured to be in the search space set).

Aspects of the disclosure are initially described in the context of a wireless communications system. Aspects of the disclosure are further illustrated in the context of a configuration and process flow. Aspects of the disclosure are further illustrated by and described with reference to apparatus diagrams, system diagrams, and flowcharts that relate to virtual search space sets for beam indication.

Figure 1:
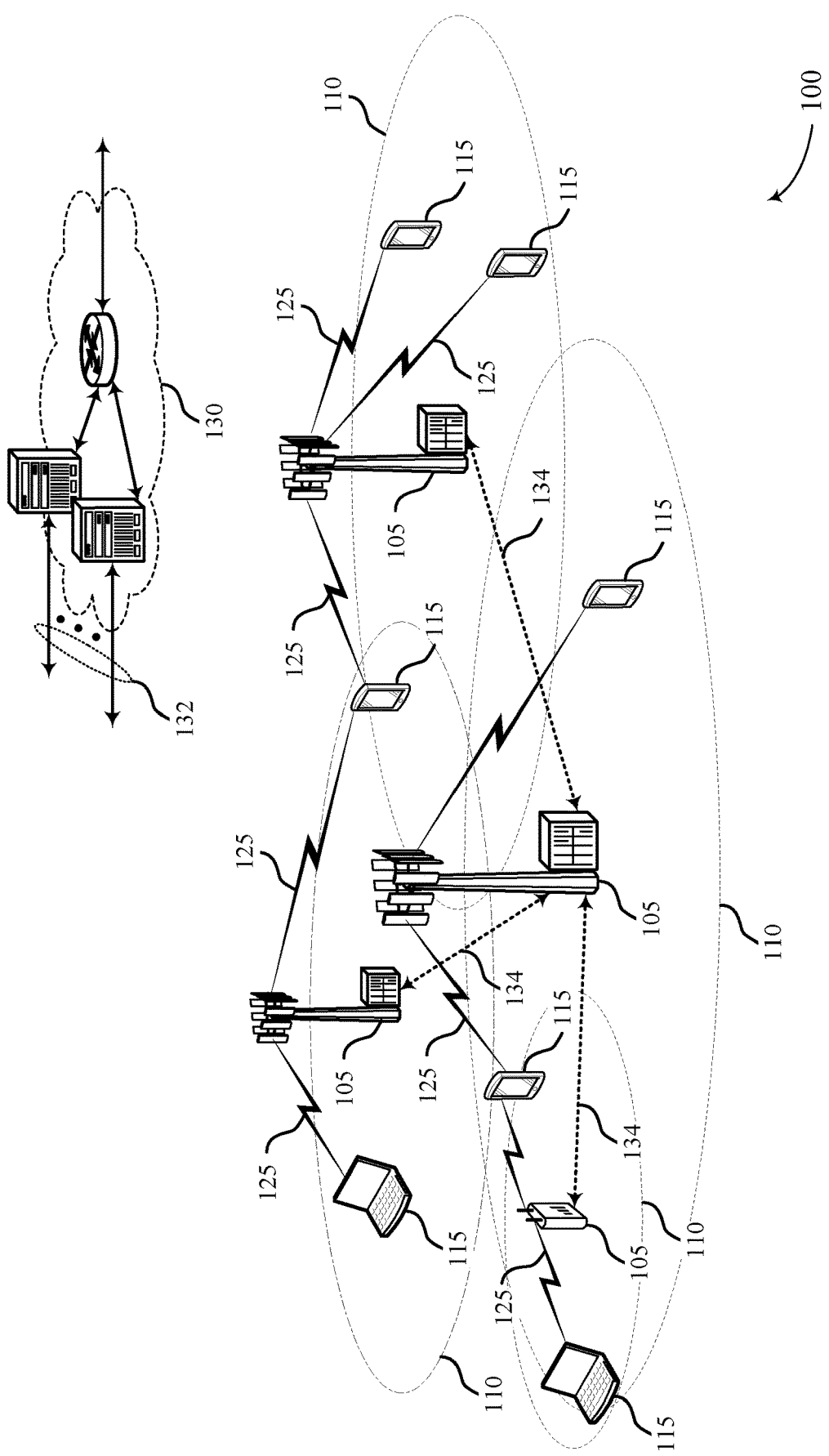
FIGS. 1 and 2 illustrate examples of a wireless communications system that supports virtual search space sets for beam indication in accordance with aspects of the present disclosure.

FIG. 1 illustrates an example of a wireless communications system 100 that supports virtual search space sets for beam indication in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broad-band communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space set and one or more UE-specific control regions or UE-specific search space sets).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

The wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers. In some cases, the wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 may identify frequency resources for a PDSCH to be transmitted to a UE 115 in a first TTI. In some cases, the base station 105 may transmit, to the UE 115, configuration information for a control channel search space set in a second TTI. The second TTI may be preceding the first TTI. The configuration information may include an indication of an absence of a PDCCH transmission to be sent in the control channel search space set to indicate the identified frequency resources for the PDSCH, and a set of frequency resources for the control channel search space set. In some cases, the base station 105 may transmit the configuration information for the control channel search space set using RRC signaling. The configuration information may include a coreset configuration, or the identified time resources, frequency resources, or both, corresponding to resources of the coreset configuration, or both. The UE 115 may receive the configuration information for the control channel search space set in the first TTI, and identify frequency resources allocated for the PDSCH in the second TTI based at least in part on the set of time and/or frequency resources for the control channel search space set in the first TTI and the indication of the absence of a PDCCH transmission to be sent in the control channel search space set. The UE 115 may refrain from performing blind decoding in the control channel search space set based on receiving the indication of the absence of the PDCCH transmission (e.g., an indication that the number of PDCCH candidates is zero). In some cases, the base station 105 may transmit in a field of a DCI, a transmission configuration indication (TCI) state. The TCI state including a spatial quasi-collocation (QCL) parameter for a beam indication, which the UE 115 may receive.

The base station 105 may transmit (and the UE 115 may receive) a PDSCH transmission in the first TTI using the identified frequency resources for the PDSCH, to the UE 115. In some cases, the base station 105 may transmit (and the UE 115 may receive) the PDSCH transmission in the first TTI using a beam corresponding to the identified frequency resources based at least in part on a scheduling offset of the PDSCH transmission being greater than, or greater than or equal to, a threshold value. Alternatively, the base station 105 may transmit (and the UE 115 may receive) the PDSCH transmission in the first TTI using a first beam based at least in part on a scheduling offset of the PDSCH transmission being less than, or less than or equal to, a threshold value. The first beam being different from a second beam corresponding to the identified frequency resources.

Figure 2:
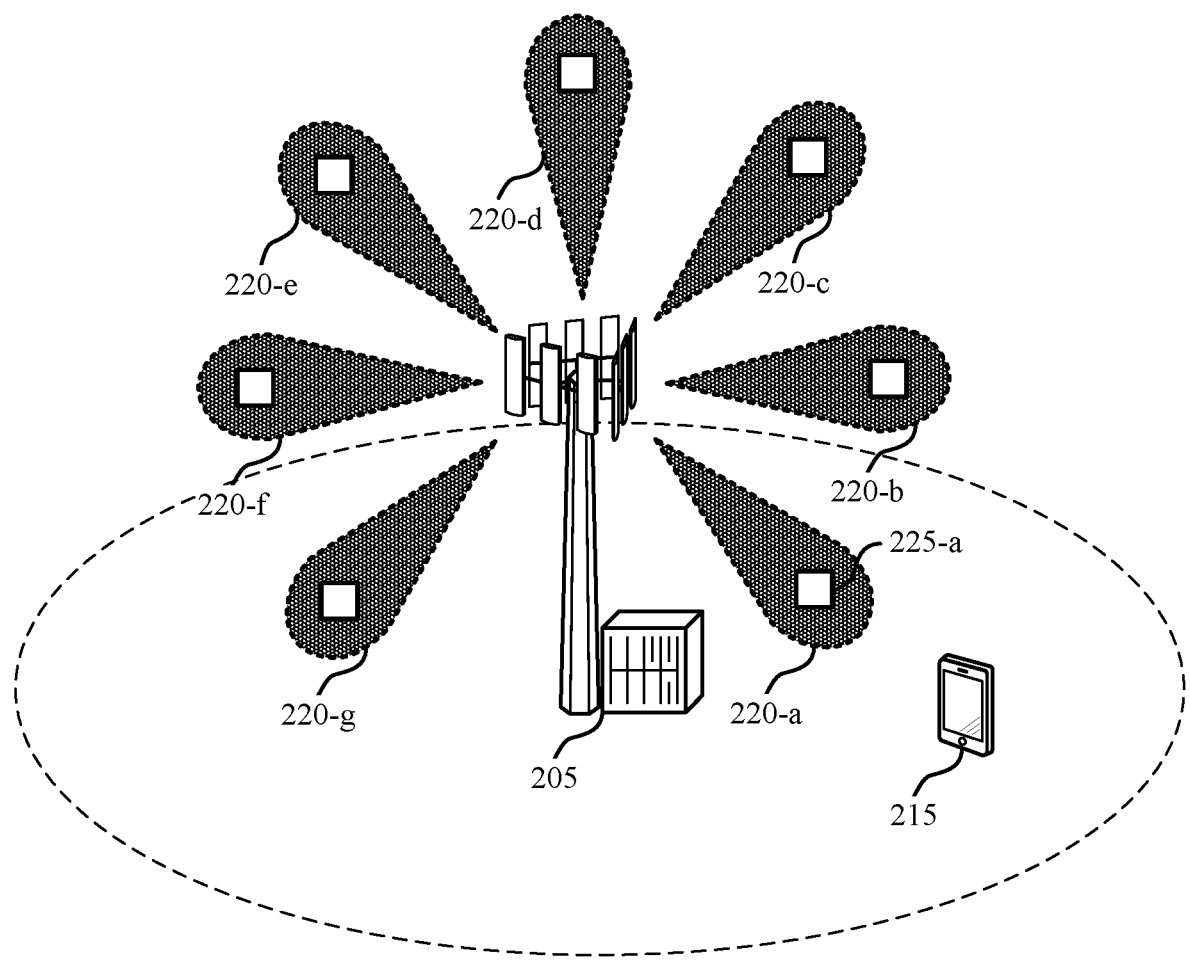

FIG. 2 illustrates an example of a wireless communications system 200 that supports virtual search space sets for beam indication in accordance with various aspects of the present disclosure. In some examples, the wireless communications system 200 may implement aspects of the wireless communications system 100. The wireless communications system 200 may include a base station 205 and a UE 215, which may be examples of the corresponding devices described with reference to FIG. 1. The wireless communications system 200 may also operate according to a radio access technology (RAT) such as a fifth generation (5G) new radio (NR) RAT, although techniques described herein may be applied to any RAT and to systems that may concurrently use two or more different RATs that support beamformed transmissions. Some examples of the wireless communications system 200 may support one or more virtual search space sets to reduce overhead and decrease unnecessary blind decoding of a physical channel (e.g., a PDCCH).

The base station 205 may perform a RRC procedure (e.g., cell acquisition procedure, random access procedure, RRC connection procedure, RRC configuration procedure) with the UE 215. The base station 205 may be configured with multiple antennas, which may be used for directional or beamformed transmissions (e.g., beamformed communication beams 220-a through 220-g). In some examples, the RRC procedure may include a beam sweep procedure. As illustrated in FIG. 2, the base station 205 may transmit a number of beamformed communication beams 220-a through 220-g in different directions within a coverage area.

As part of the RRC procedure, the base station 205 and the UE 215 may synchronize before the base station 205 schedules and allocates resources (e.g., time and frequency resources) for the UE 215. The base station 205 may transmit one or more synchronization signals, associated with a carrier bandwidth for synchronization. A synchronization signal may include, for example, a primary synchronization signal and a secondary synchronization signal. To determine a suitable communication beam 220 for communication, the base station 205 may transmit one or more synchronization signals in one or more transmissions 225 according to a beam sweep pattern. In some cases, the UE 215 may be time-synchronized with the base station 205, and may be capable of receiving one or more transmissions 225 during a slot, a TTI, a shortened-TTI (s-TTI), a subframe or a frame, etc.

The base station 205 may schedule and allocate resources to the UE 215 for a transmission 225 via a beamformed transmission (e.g., beamformed communication beam 220-a). For example, the base station 205 may schedule and allocate resources for a downlink transmission of control information. The base station 205 may, in some cases, configure a coreset and search space set for transmission of control information (e.g., DCI) to the UE 215 on a PDCCH. A search space set may refer to a coreset, which may be identified based on an identifier of the coreset (e.g., coreset-ID). A search space set may refer to any resources (e.g., time and frequency resources such as groups of resource elements, resource element groups, etc.) used for transmitting control information within a given slot (e.g., a TTI, an s-TTI).

The slot may be part of a resource grid that may correspond to a system bandwidth that the base station 205 may allocate to the UE 215, In some cases, the resource grid may continue indefinitely in time. Information may be organized as a function of frequency as well as time using the resource grid. A resource element in a resource grid may span one symbol by one sub-carrier. Each resource element may carry two, four, or six physical channel bits. Resource elements may be grouped into resource blocks (RBs), each of which may span a certain frequency range, for example of 180 kHz (e.g., 12 sub-carriers). The base station 205 may allocate RBs to the UE 215 by allocating the symbols and subcarriers within each slot in units of the corresponding RBs to the UE 215. Each slot may span a number of symbol periods (e.g., 14 modulation symbol periods) (e.g., OFDM symbols) and a number of sub-carriers within a bandwidth.

A coreset may span multiple RBs in a frequency domain, and may span a number of modulation symbol periods in a time domain. The coreset may be divided into a number of CCEs, and may support a number of different aggregation levels for transmission of control information. Each aggregation level may correspond to the number of CCEs allocated for a PDCCH candidate. For example, an aggregation level of four may indicate that the base station 205 transmits control information for that aggregation level in multiples of four CCEs of a coreset. This control information contained within a four CCE-length segment may be referred to as a search candidate or a PDCCH decoding candidate. In some cases, multiple coresets may be configured for a slot. The base station 205 may transmit a DCI within a search space set in search candidates (e.g., PDCCH decoding candidates) for different aggregation levels. The UE 215 may monitor the search space set for the search candidates (e.g., PDCCH decoding candidates), and may perform blind decoding for the PDCCH candidates, during which the UE 215 may carry out multiple decode attempts in the search space sets until detecting the DCI. In some examples, the DCI carried on the PDCCH may include a schedule and allocation of resources (e.g., time and frequency resources) for a PDSCH transmission.

The UE 215 may be preconfigured with search space configuration information. In some cases, the base station 205 may transmit configuration information associated with a search space set to the UE 215. The configuration information may include an RRC parameter indicated to the UE 215 via higher layer signaling (e.g., RRC signaling). The RRC parameter may include an indication of whether a TCI is present in the DCI. In some examples, the base station 205 may configure multiple TCI states for the UE 215 for a QCL indication (e.g., including spatial QCL parameter for beam indication). For example, if an RRC parameter TCI-PresentInDCI is set as 'enabled' for the coreset scheduling a PDSCH transmission, the UE 215 may assume that a TCI field is always present in the DCI of the PDCCH transmitted on the coreset. Alternatively, if the parameter TCI-PresentIn-DCI is set as 'disabled' for the coreset scheduling the PDSCH, the UE 215 may assume that the TCI state for the PDSCH is identical with the TCI state applied for the coreset used for the PDCCH transmission.

In such cases, if the parameter TCI-PresentinDCI is set as 'enabled', the UE 215 may use the TCI-States according to the value of the TCI field detected in the PDCCH with DCI for selecting a directional or beamformed beam (e.g., beamformed communication beams 220-a through 220-g) for PDSCH reception. In some examples, for both cases where TCI-PresentInDCI is 'enabled' and TCI-PresentInDCI is 'disabled,' if a scheduling offset $k_0$ is less than a threshold, the UE 215 may use a directional or beamformed beam based on the TCI state used for PDCCH QCL indication of the lowest coreset-ID in a latest slot in which one or more coresets are configured for the UE 215. Alternatively, the UE 215 may use a directional or beamformed beam for PDSCH given by the TCI state indicated in the DCI, if the offset $k_0$ between the reception of the DCI and the corresponding PDSCH is equal to or greater than the threshold. However, for some PDSCH transmissions without a scheduling PDCCH (e.g., in semi-persistent scheduling), a default directional or beamformed beam from a recent coreset may be invalid (e.g., when a search space set monitoring periodicity is very large (a periodicity greater than a configured threshold value)). However, having the base station 205 configure multiple search space sets having a small periodicity (a periodicity lesser than a configured threshold value) for default beam indication may unnecessarily increase the overhead of PDCCH blind decoding for the UE 215.

The base station 205 may configure a virtual search space set for the UE 215. The wireless communications system 200 may support a zero number of PDCCH candidates at least for virtual search space set configuration. The virtual search space set may be one type of search space set defined and used for PDSCH beam indication. In some cases, the wireless communication system 200 may configure separate sets of search space sets. For example, a first set may include a number of virtual search space sets and a second set may include a number of normal search space sets. The number of normal search space sets per bandwidth part (BWP) may be limited to restrict UE's blind decoding overhead. However, a virtual search space set configured by the base station 205 may not increase an overhead of blind decoding for the UE 215, and the number of virtual search space sets may be much larger than the number of normal search space sets.

A virtual search space set, as described herein, may refer to a search space set that is absent of PDCCH candidates (e.g., has been indicated as not including any PDCCH candidates). As such, if the UE 215 is configured with a virtual search space set, the UE 215 may not anticipate a PDCCH transmission within the search space set and thus may refrain from performing blind decoding in the virtual search space set. Since there is no actual PDCCH transmission, the time/frequency resources associated with the virtual search space set may be reused by other transmissions, such as PDSCH and/or reference signals. In some cases, the base station 205 may reuse an existing search space set configuration to configure the virtual search space set. For example, the base station 205 may reconfigure an existing search space set configuration by setting a number of PDCCH candidates (nrofCandidates) to zero for some or all aggregation levels. In addition, the base station 205 may not use some existing search space set configuration parameters for configuring a virtual search space set.

The base station 205 may configure or reconfigure the RRC parameter to indicate a virtual search space set configuration. For example, the base station 205 may use the TCI state for PDCCH QCL indication of a lowest-indexed coreset among a number of coresets including a search space set (e.g., either virtual or normal) configured for the UE 215 with a latest modulation symbol period (e.g., OFDM symbol). As such, rather than applying a TCI state for a coreset with a latest slot, the UE 215 may use the TCI state for a coreset with a latest OFDM symbol. In some cases, a directional or beamformed beam for PDSCH may use a default TCI state when the scheduling offset $k_0$ (e.g., in units of TTIs or slots) is less than a threshold offset (e.g., a threshold number of TTIs or slots) for examples where TCI-PresentInDCI is 'enabled' and where TCI-PresentIn-DCI is 'disabled.' In some cases, the base station 205 may schedule the PDSCH according to semi-persistent scheduling.

Figure 3:
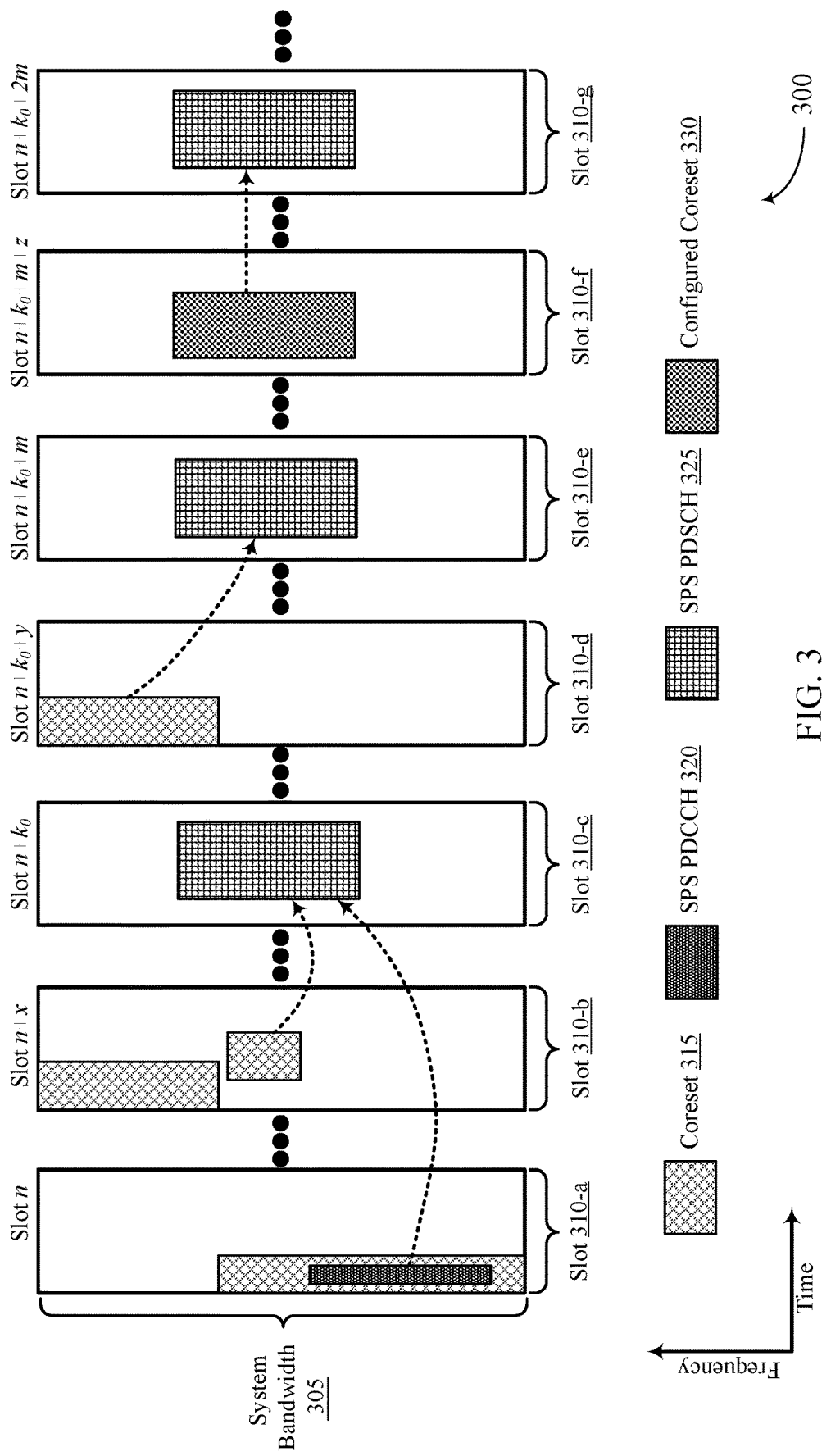
FIG. 3 illustrates an example of a configuration that supports virtual search space sets for beam indication in accordance with aspects of the present disclosure.

FIG. 3 illustrates an example of a configuration 300 that supports a virtual search space set for beam indication in accordance with various aspects of the present disclosure. In some examples, the configuration 300 may implement aspects of the wireless communications system 100 and 200. In some examples, the configuration 300 may support semi-persistent scheduling with beam indication.

The configuration 300 may illustrate portions of a resource grid. With reference to FIG. 2, the resource grid may correspond to a system bandwidth 305 that the base station 205 may allocate to the UE 215, and the resource grid may continue indefinitely in time. Information may be organized as a function of frequency as well as time using the resource grid. A resource element may span one symbol by one sub-carrier. Each resource element may carry two, four, or six physical channel bits depending on the modulation coding scheme (MCS) (e.g., quadrature phase shift keying (QPSK), 16-quadrature amplitude modulation (QAM), 64-QAM, or the like). The base station 205 may group resource elements into RBs, each of which may span a certain frequency range, for example 180 kHz (e.g., 12 sub-carriers). In addition, the base station 205 may allocate RBs to the UE 215 by allocating the symbols and sub-carriers within each slot 310 (e.g., slot 310-a through slot 310-g) in units of RBs to the UE 215. Each slot 310-a through 310-g may span 14 modulation symbol periods and a number of subcarriers within the system bandwidth 305.

Some examples of wireless communications systems (e.g., fourth generation (4G) long-term evolution (LTE)), may RRC configure periodicity of semi-persistent scheduled PDSCH. In some cases, the base station 205 may also transmit PDCCH with semi-persistent scheduling cell-radio network temporary identifier (SPS-C-RNTI) to allocate resources and trigger semi-persistent scheduled PDSCH transmissions.

The UE 215 may receive a semi-persistent scheduled PDSCH 325 in slot 310-c. The first semi-persistent scheduled PDSCH 325 in slot 310-c may follow rules and procedures similar to normal PDSCH. A second semi-persistent scheduled PDSCH 325 in slot 310-e and so forth may use a default beam, as long as there is no PDCCH overriding the resources of semi-persistent scheduled PDSCH 325. If there is a PDCCH overriding the resources, the same rules and procedure as normal PDSCH apply with respect to the PDCCH. The rules may be based on a TCI-PresentInDCI indication, scheduling offset $k_0$, and a threshold value.

A coreset 315 in slot 310-a may carry a PDCCH 320 with SPS-C-RNTI. The PDCCH 320 with SPS-C-RNTI may carry a DCI providing scheduling information for a corresponding semi-persistent scheduled PDSCH 325. The DCI may include a field indicating a TCI state when TCI-PresentInDCI is 'enabled.' The TCI state may include a spatial QCL parameter for a beam indication. In some cases, if a scheduling offset $k_0$ is greater than or equal to a threshold, the TCI state included in the DCI of the PDCCH 320 in slot 310-a may indicate a beam indication for a semi-persistent scheduled PDSCH 325 in slot 310-c. When TCI-PresentInDCI is 'disabled,' and if a scheduling offset $k_0$ is greater than or equal to a threshold, the same TCI state applied for the coreset 315 in slot 310-a may be assumed for the TCI state for the semi-persistent scheduled PDSCH 325 in slot 310-c.

Two coresets 315 may be present in the example of slot 310-b, which is the latest slot before PDSCH 325 in slot 310-c where one or more coresets are configured for the UE 215. In this case, the UE 215 may select a beam indication for a semi-persistent scheduled PDSCH 325 in slot 310-c based on an indication of a TCI state applied for a coreset closest to the PDSCH 325 (i.e., indicated by TCI state of coreset with the latest/most recent OFDM symbol) (in this case, the coreset in the middle portion of the slot 310-b), and based on if the scheduling offset is lesser than the threshold.

In slot 310-d, which is the latest slot before semi-persistent scheduled PDSCH 325 in slot 310-e in which one or more coresets are configured for the UE 215, a coreset 315 configured for the UE 215 may not include any PDCCH, and may indicate the beam for the PDSCH 325 in slot 310-e based on an indication of a TCI state applied for the coreset. The base station 205 may configure a virtual search space set for the UE 215 in which no PDCCH 320 are configured for sending. The base station 205 may generate configuration information that may be for a control channel search space set in slot 310-f. The base station 205 may transmit the configuration information to the UE 215 via RRC signaling. The configuration information may include an RRC parameter that may indicate an absence or lack of a PDCCH transmission to be sent in the control channel search space set (e.g., by indicating that a number of candidate PDCCHs 320 is 0). In some cases, a configured coreset 330 may be part of slot 310-f. The configured coreset 330 may contain a virtual search space set. The virtual search space set may indicate a beam indication for receiving a semi-persistent scheduled PDSCH 325 during slot 310-g based on an indication of a TCI state applied for the configured coreset 330. Based on receiving the configuration information from the base station 205, the UE 215 may refrain from performing blind decoding on the configured coreset 330 because of the indication of the absence or lack of a PDCCH transmission during slot 310-f based on the virtual search space configuration. The UE 215 may receive the semi-persistent scheduled PDSCH 325 during slot 310-g using a beam corresponding to the beam indication related to the virtual search space set. The UE 215 may also refrain from performing blind decoding in the virtual search space set of slot 310-f.

Figure 4:
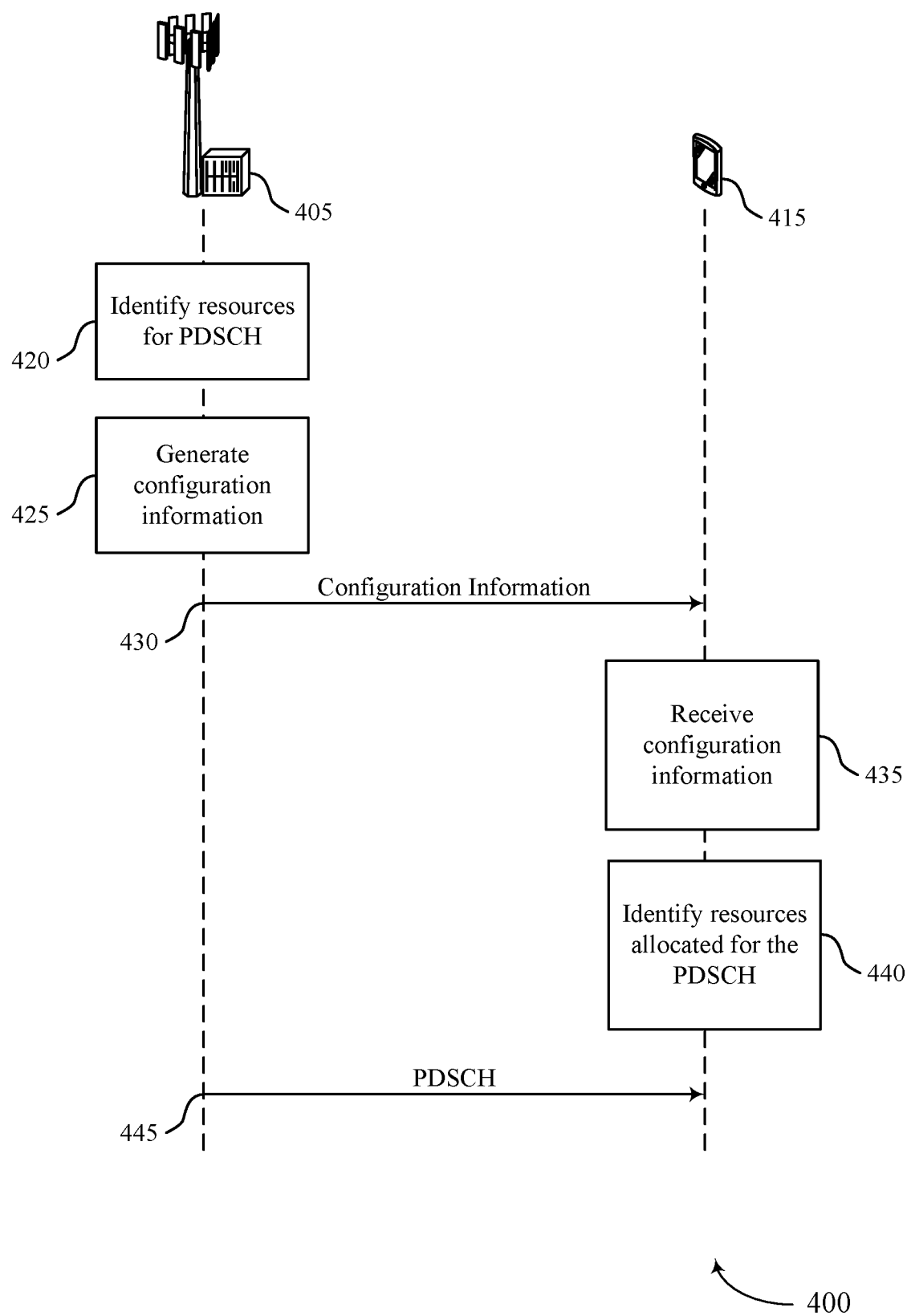
FIG. 4 illustrates an example of a process flow that supports virtual search space sets for beam indication in accordance with aspects of the present disclosure.

FIG. 4 illustrates an example of a process flow 400 that supports virtual search space set for beam indication in accordance with various aspects of the present disclosure. In some examples, the process flow 400 may implement aspects of wireless communications system 100 and 200. Base station 405 and UE 415 may be examples of the corresponding devices described with reference to FIGS. 1 and 2.

In the following description of the process flow 400, the operations between the base station 405 and the UE 415 may be transmitted in a different order than the exemplary order shown, or the operations performed by the base station 405 and the UE 415 may be performed in different orders or at different times. Certain operations may also be left out of the process flow 400, or other operations may be added to the process flow 400.

In some examples, the process flow may commence with the base station 405 establishing a connection with the UE 415 (e.g., performing a cell acquisition procedure, a random access procedure, an RRC connection procedure, an RRC configuration procedure, etc.).

At 420, the base station 405 may identify resources to be used to transmit using a PDSCH to UE 415. For example, the base station 405 may identify frequency and time resources for a PDSCH to be transmitted to the UE in a first TTI. The base station 405 may identify the resources based on a semi-persistent scheduling for the UE 415. UE 415 may have been previously provided the configuration information for the semi-persistent scheduling by base station 405, for example, as part of control information transmitted over a PDCCH.

In some examples, the base station 405 may communicate with the UE 415, and may send control transmissions, such as DCI, via a PDCCH. In some examples, control information, such as DCI, may be included in a coreset. The DCI may schedule and allocate resources for the PDSCH. The UE 415 may be configured to monitor a PDCCH within a search space set, which may include multiple search candidates. In some cases, search candidates may be control channel candidates or PDCCH candidates. In further cases, each search space set may include multiple CCEs, and may include one or more search candidates, each of which may include one or more CCEs. The UE 415 may be configured to monitor one or more search candidates in the search space set, and may blindly decode the one or more CCEs of the search candidate to receive control information.

However, for some PDSCH without a scheduling PDCCH (e.g., in the case of semi-persistent scheduling of the PDSCH), a default directional or beamformed beam from a recent coreset may be outdated (e.g., when a search space set monitoring periodicity is very large, and a UE 415 may have moved or the channel conditions for the beam may have degraded over time). However, in cases where the base station 405 configures multiple search space sets having a small periodicity for the default beam indication may unnecessarily increase the overhead of PDCCH blind decoding for the UE 415. The base station 405 may configure a virtual search space set for the UE 415, in which no PDCCH are configured to be sent. As such the UE 415 may refrain from blind decoding in the virtual search space set. The base station 405 may configure or reconfigure an RRC parameter to indicate a virtual search space configuration to the UE 415.

At 425, the base station 405 may generate configuration information. In some cases, the configuration information may include a coreset configuration, the identified frequency resources corresponding to resources of the coreset configuration. For example, the base station 405 may generate configuration information that may be for a control channel search space set in a second TTI. The second TTI may precede the first TTI. The configuration information may include an indication of an absence or lack of a PDCCH transmission to be sent in the control channel search space set (e.g., by indicating that a number of PDCCH is 0) to indicate the identified frequency resources for the PDSCH, and a set of frequency resources for the control channel search space set. In some cases, the control channel search space set associated with the coreset contains a zero number of PDCCH candidates.

At 430, the base station 405 may transmit the configuration information to the UE 415. In some cases, the base station 405 may transmit configuration information for a control channel search space set using RRC signaling.

At 435, the UE 415 may receive the configuration information from the base station 405. At 440, the UE 415 may identify resources allocated for the PDSCH. For example, the UE 415 may identify frequency and time resources allocated for the PDSCH in the second TTI based on the set of frequency resources for the control channel search space set in the first TTI and the indication of the absence of a PDCCH transmission in the control channel search space set. In some cases, the UE 415 may refrain from performing blind decoding in the control channel search space set based on receiving the indication of the absence of the PDCCH transmission.

At 445, the base station 405 may transmit PDSCH to the UE 415. The UE 415 may receive the PDSCH transmission in the second TTI using the identified frequency resources. In some examples, the UE 415 may receive the PDSCH transmission in the second TTI using a beam corresponding to the identified frequency resources based at least in part on a scheduling offset of the PDSCH transmission being greater than or equal to a threshold value. Alternatively, the UE 415 may receive the PDSCH transmission in the second TTI using a first beam based on a scheduling offset of the PDSCH transmission being less than or equal to a threshold value. The first beam may be different from a second beam corresponding to the identified frequency resources.

Figure 5:
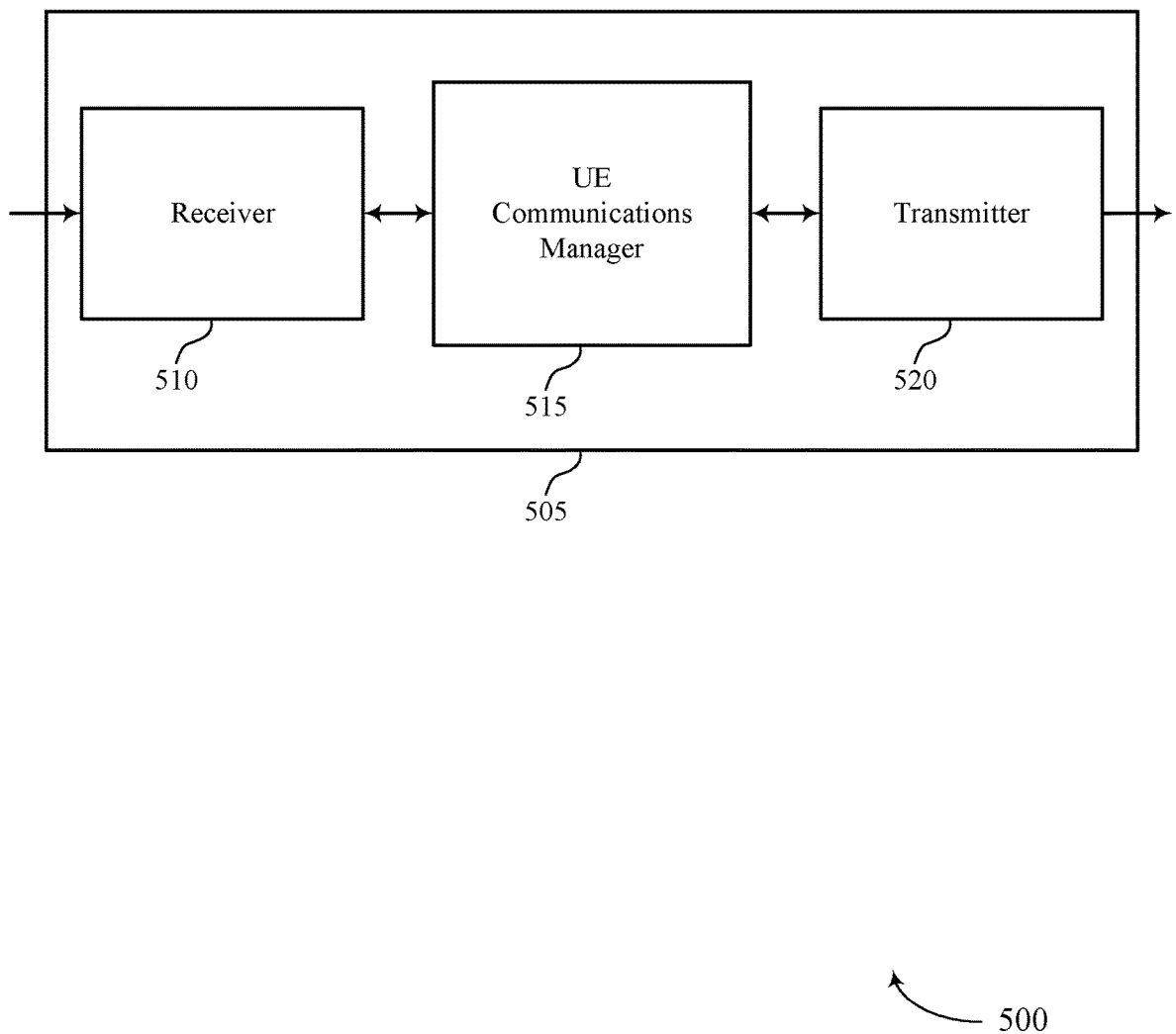
FIGS. 5 through 7 show block diagrams of a device that supports virtual search space sets for beam indication in accordance with aspects of the present disclosure.

FIG. 5 shows a block diagram 500 of a wireless device 505 that supports virtual search space sets for beam indication in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to virtual search space sets for beam indication, etc.). The receiver may pass information on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may receive configuration information for a control channel search space set in a first TTI, the received configuration information including an indication of an absence of a PDCCH transmission in the control channel search space set, and a set of time and frequency resources for the control channel search space set, identify time and frequency resources allocated for a PDSCH in a second TTI based on the set of time and frequency resources for the control channel search space set in the first TTI and the indication of the absence of a PDCCH transmission the control channel search space set, and receive a PDSCH transmission in the second TTI using the identified time and frequency resources.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
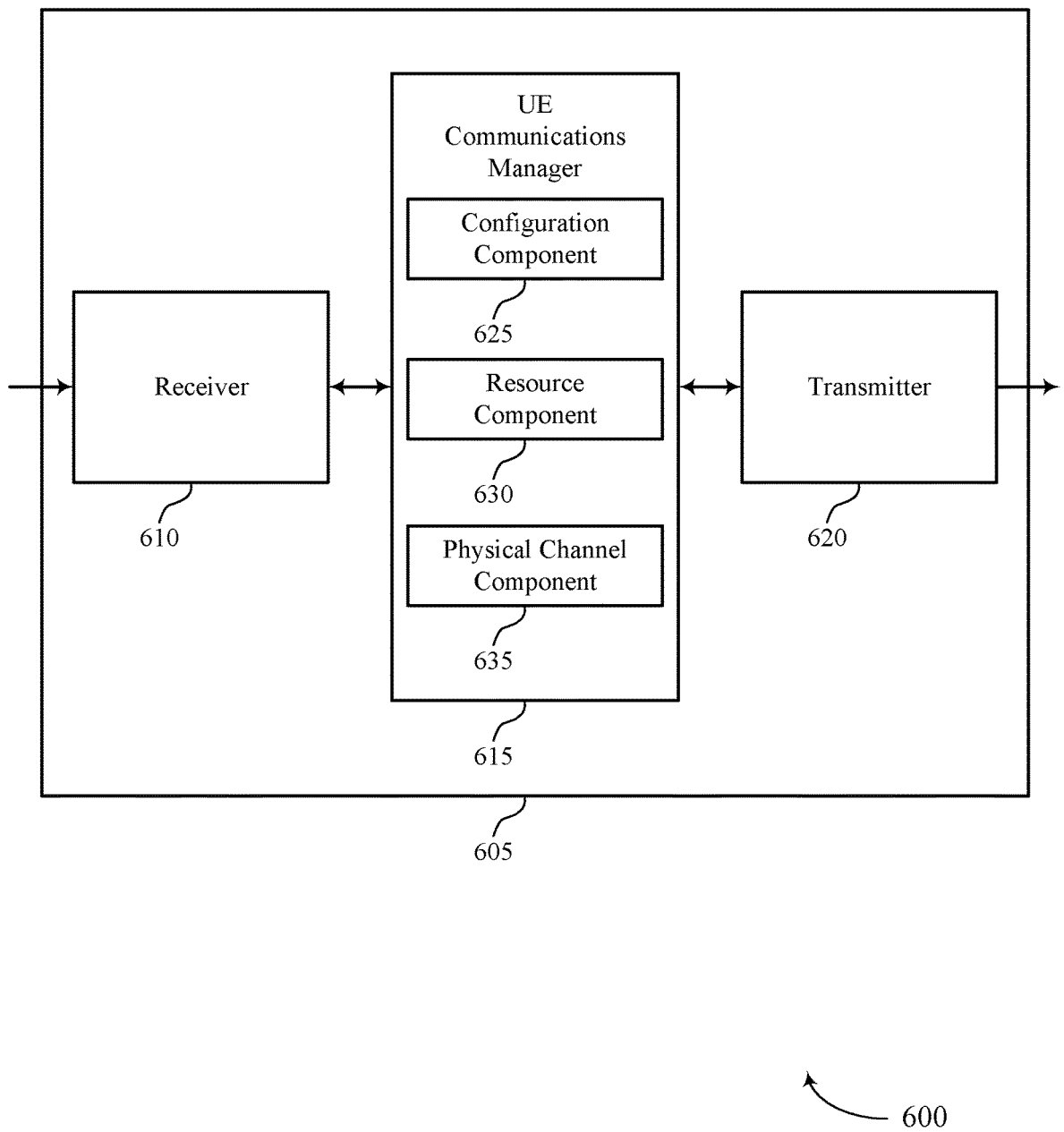

FIG. 6 shows a block diagram 600 of a wireless device 605 that supports virtual search space sets for beam indication in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to virtual search space sets for beam indication, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include configuration component 625, resource component 630, and physical channel component 635.

Configuration component 625 may receive configuration information for a control channel search space set in a first TTI. The received configuration information including an indication of an absence of a PDCCH transmission in the control channel search space set, and a set of frequency resources for the control channel search space set. In some cases, the configuration information for the control channel search space set is received in radio resource control signaling. In some cases, the configuration information includes a coreset configuration from the base station, a TCI state, and the time and frequency resources corresponding to resources of the coreset configuration. In some cases, the control channel search space set associated with the coreset contains a zero number of PDCCH candidates.

Resource component 630 may identify time and frequency resources allocated for a PDSCH in a second TTI based on the set of time and frequency resources for the control channel search space set in the first TTI and the indication of the absence of a PDCCH transmission the control channel search space set.

Physical channel component 635 may receive a first TCI state in a field of a DCI, and may receive a PDSCH transmission in the identified time and frequency resources. Physical channel component 635 may receive the PDSCH transmission in the identified time and frequency resources using a first beam associated with the received TCI state. The identified time and frequency resources may be based on a scheduling offset of the PDSCH transmission being greater than or equal to a threshold value. In some other cases, physical channel component 635 may receive the PDSCH transmission in the identified time and frequency resources using a first beam associated with a second TCI state based on a scheduling offset of the PDSCH transmission being less than or equal to a threshold value, where the first beam may be different from a second beam associated with the first TCI state, and the second TCI state of a control resource set associated with the control channel search space set.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
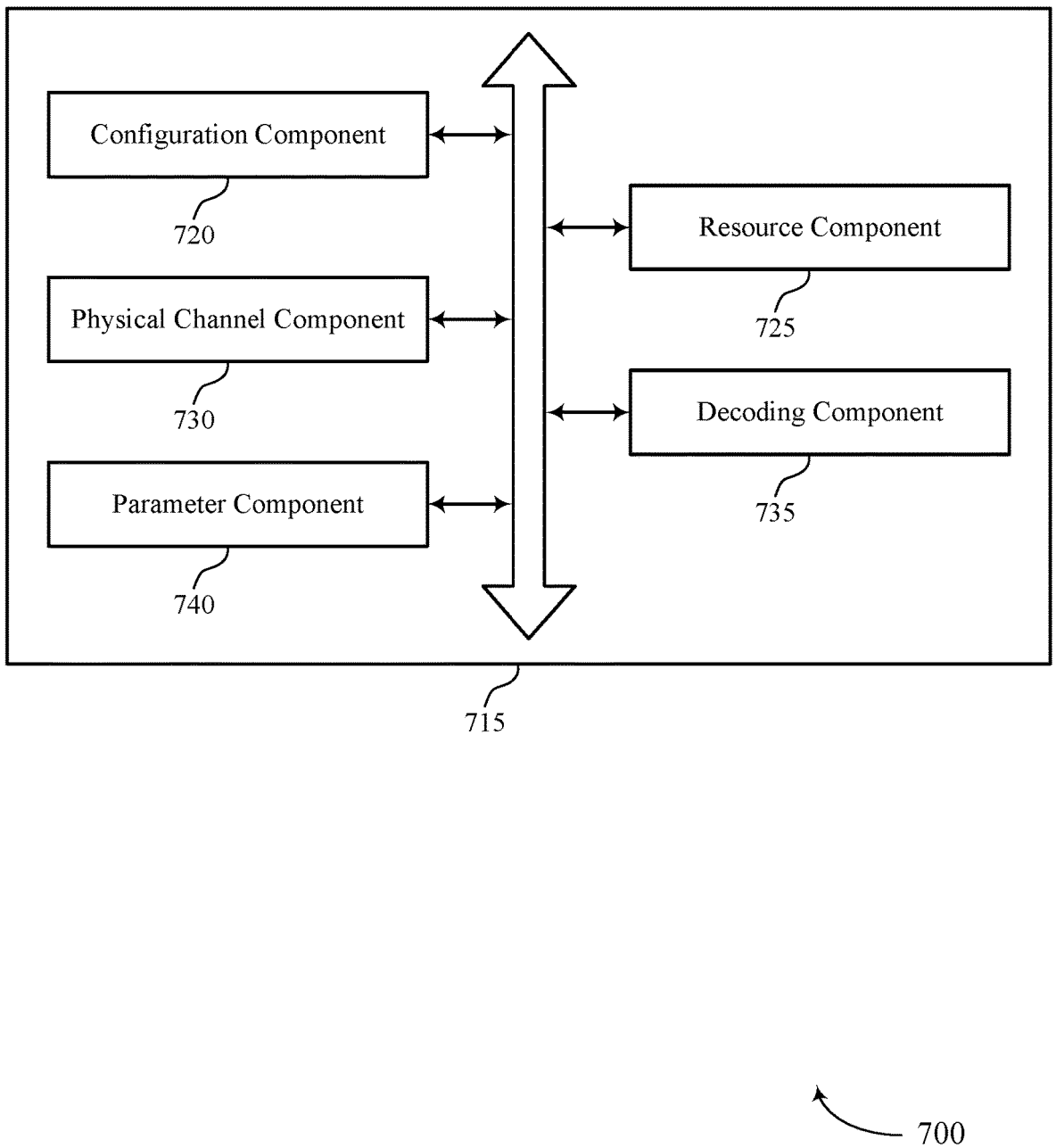

FIG. 7 shows a block diagram 700 of a UE communications manager 715 that supports virtual search space sets for beam indication in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include configuration component 720, resource component 725, physical channel component 730, decoding component 735, and parameter component 740. Each of these modules may communicate, directly or indirectly, with one another (e.g., via one or more buses).

Configuration component 720 may receive configuration information for a control channel search space set in a first TTI. The received configuration information including an indication of an absence of a PDCCH transmission in the control channel search space set, and a set of time and frequency resources for the control channel search space set. In some cases, the configuration information for the control channel search space set is received in radio resource control signaling. In some cases, the configuration information includes a coreset configuration from the base station, a TCI state, and the time and frequency resources corresponding to resources of the coreset configuration. In some cases, the control channel search space set associated with the coreset contains a zero number of PDCCH candidates.

Resource component 725 may identify time and frequency resources allocated for a PDSCH in a second TTI based on the set of time and frequency resources for the control channel search space set in the first TTI and the indication of the absence of a PDCCH transmission the control channel search space set.

Physical channel component 730 may receive a first TCI state in a field of a DCI, and may receive a PDSCH transmission in the identified time and frequency resources. Physical channel component 730 may receive the PDSCH transmission in the identified time and frequency resources using a beam associated with the received TCI state. The identified time and frequency resources may be based on a scheduling offset of the PDSCH transmission being greater than or equal to a threshold value. In some other cases, physical channel component 730 may receive the PDSCH transmission in the identified time and frequency resources using a first beam associated with a second TCI state based on a scheduling offset of the PDSCH transmission being less than or equal to a threshold value, where the first beam may be different from a second beam corresponding to the associated with the first TCI state.

Decoding component 735 may refrain from performing blind decoding in the control channel search space set based on receiving the indication of the absence of the PDCCH transmission. Parameter component 740 may receive, in a field of a DCI, a TCI state, where the TCI state includes a spatial QCL parameter for a beam indication.

Figure 8:
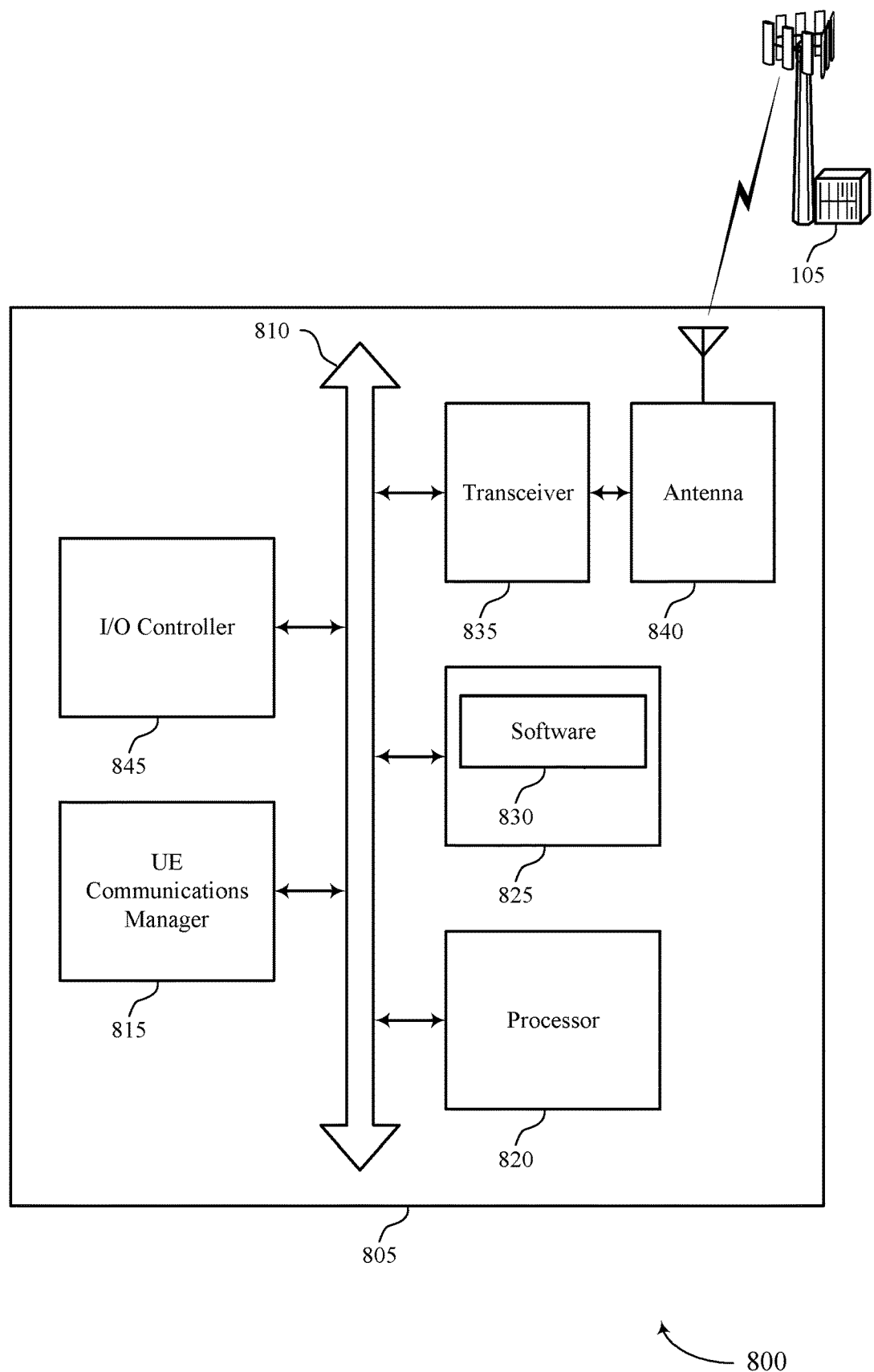
FIG. 8 illustrates a block diagram of a system including a UE that supports virtual search space sets for beam indication in accordance with aspects of the present disclosure.

FIG. 8 shows a diagram of a system 800 including a device 805 that supports virtual search space sets for beam indication in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting virtual search space sets for beam indication).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support virtual search space sets for beam indication. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
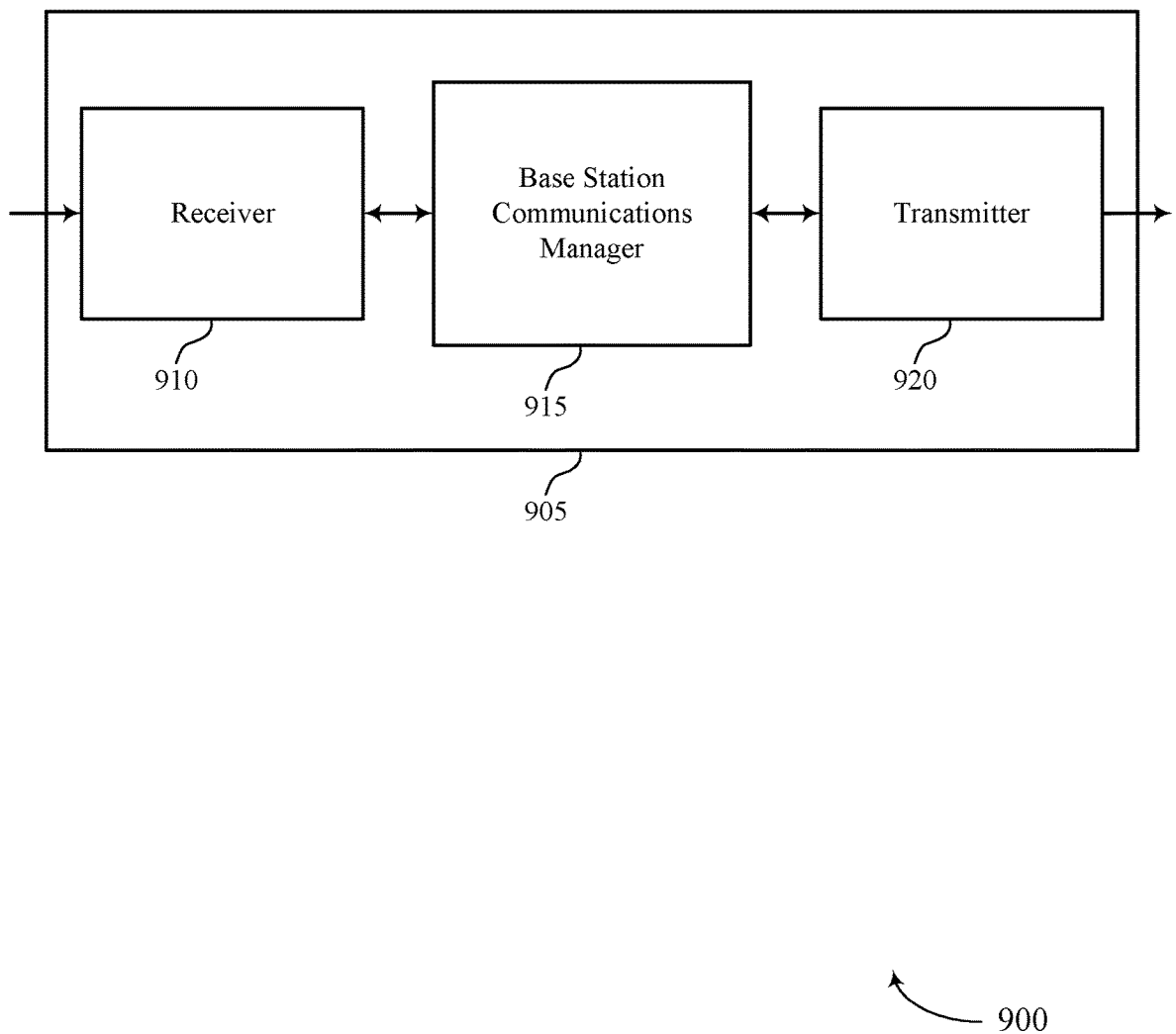
FIGS. 9 through 11 show block diagrams of a device that supports virtual search space sets for beam indication in accordance with aspects of the present disclosure.

FIG. 9 shows a block diagram 900 of a wireless device 905 that supports virtual search space sets for beam indication in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to virtual search space sets for beam indication, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify time and frequency resources for a PDSCH to transmit to a UE in a first TTI, transmit, to the UE, configuration information for a control channel search space set in a second TTI, the second TTI preceding the first TTI, and the configuration information including an indication of an absence of a PDCCH transmission to be sent in the control channel search space set to indicate the identified time and frequency resources for the PDSCH, and a set of time and frequency resources for the control channel search space set, and transmit a PDSCH transmission in the first TTI using the identified time and frequency resources for the PDSCH.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
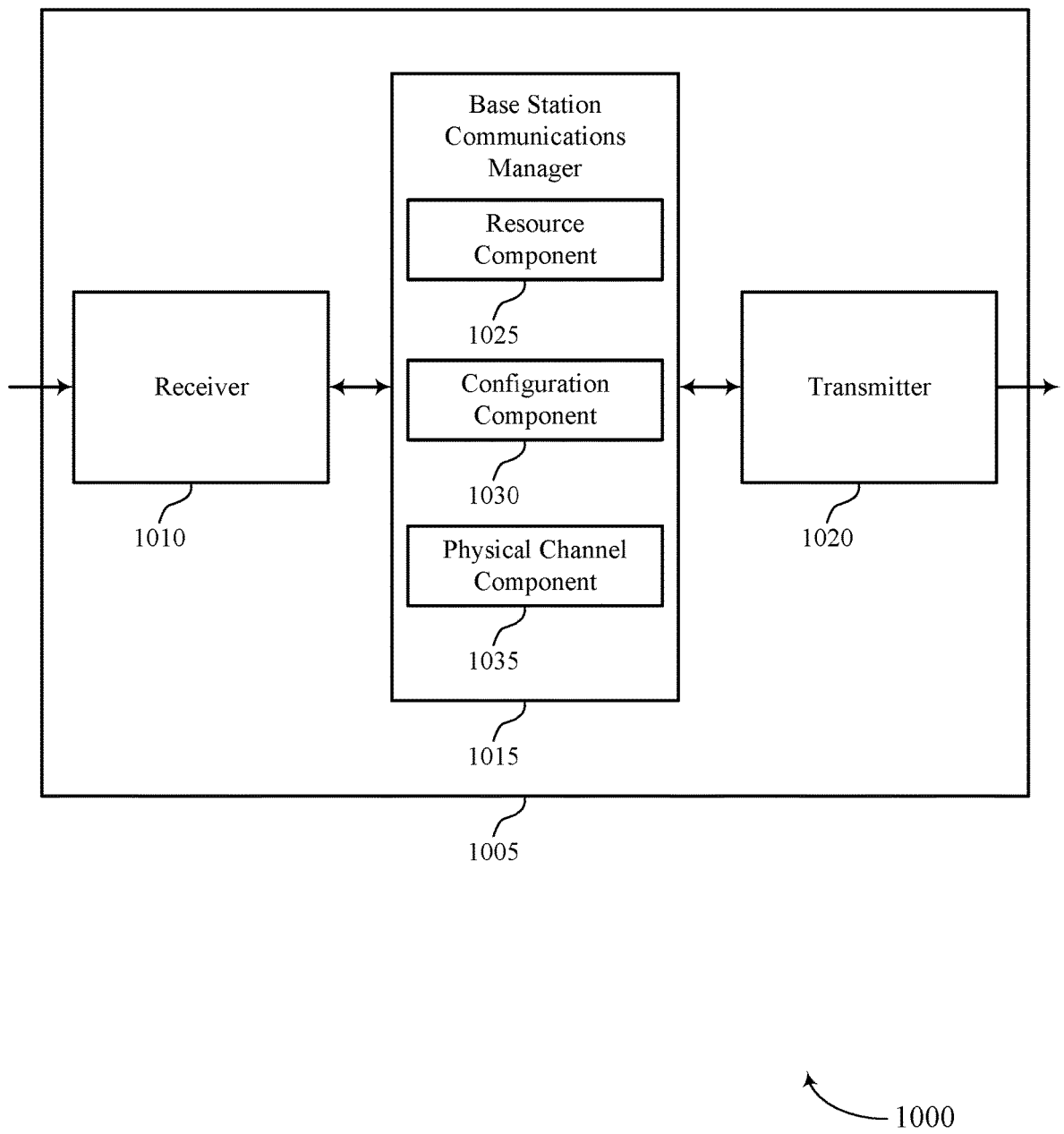

FIG. 10 shows a block diagram 1000 of a wireless device 1005 that supports virtual search space sets for beam indication in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to virtual search space sets for beam indication, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include resource component 1025, configuration component 1030, and physical channel component 1035. Resource component 1025 may identify time and frequency resources for a PDSCH to be transmitted to a UE in a first TTI.

Configuration component 1030 may transmit, to the UE, configuration information for a control channel search space set in a second TTI. The second TTI preceding the first TTI, and the configuration information including an indication of an absence of a PDCCH transmission to be sent in the control channel search space set to indicate the identified time and frequency resources for the PDSCH, and a set of time and frequency resources for the control channel search space set. Configuration component 1030 may transmit the configuration information for the control channel search space set using radio resource control signaling. In some cases, the configuration information includes a coreset configuration, a TCI state, and the time and frequency resources corresponding to resources of the coreset configuration. In some cases, the control channel search space set associated with the coreset contains a zero number of PDCCH candidates.

Physical channel component 1035 may transmit a PDSCH transmission in a first TCI state in a field of a DCI. Physical channel component 1035 may transmit the PDSCH transmission in the identified time and frequency resources using a beam associated with the transmitted TCI state, the transmission of the PDSCH based on a scheduling offset being greater than or equal to a threshold value. In other cases, physical channel component 1035 may transmit the PDSCH transmission in the identified time and frequency resources using a first beam associated with a second TCI state, and based on a scheduling offset of the PDSCH transmission being less than or equal to a threshold value. The first beam may be different from a second beam associated with the first TCI state, and the second TCI state of a control resource set associated with the control channel search space set.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
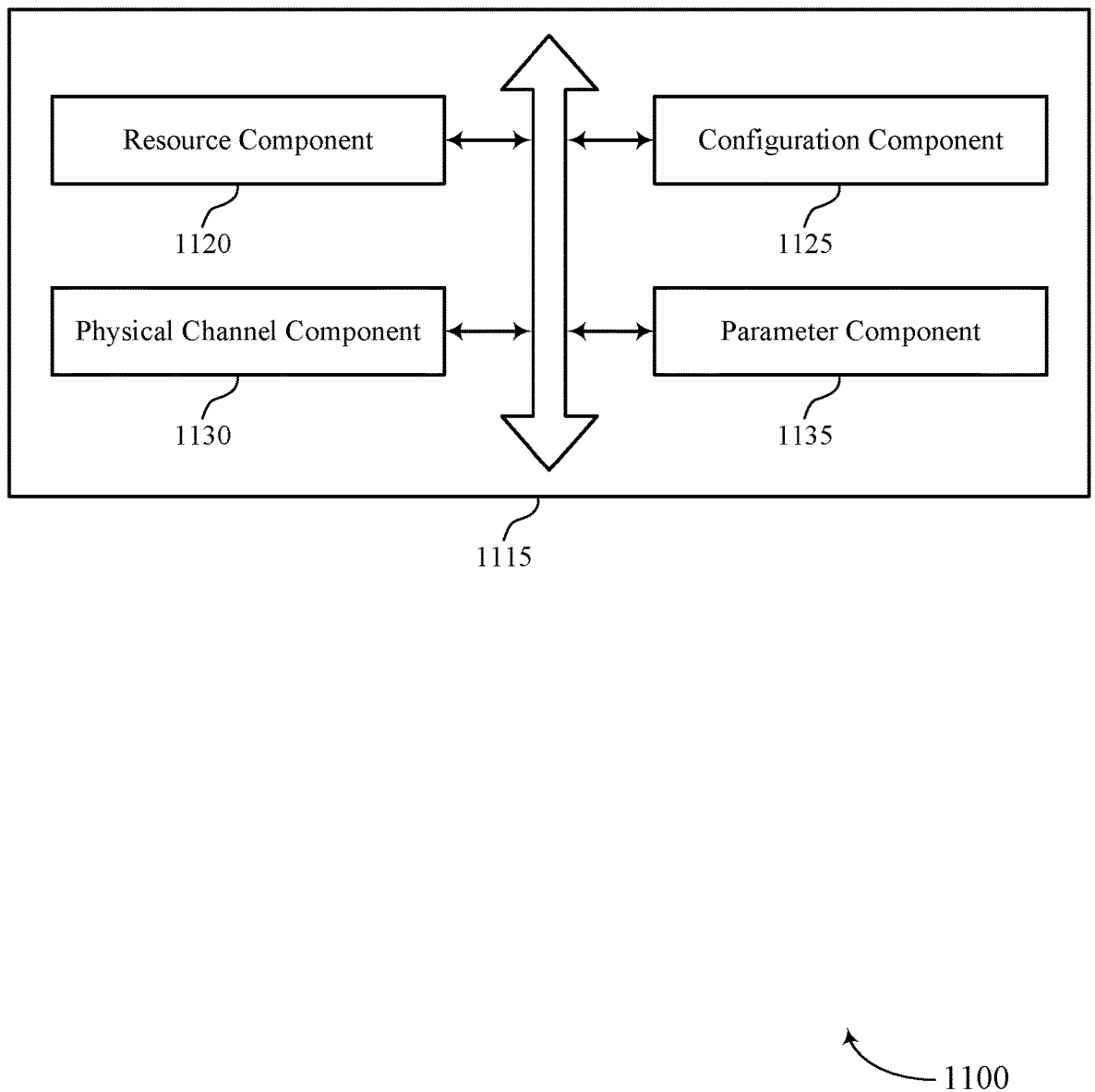

FIG. 11 shows a block diagram 1100 of a base station communications manager 1115 that supports virtual search space sets for beam indication in accordance with aspects of the present disclosure. The base station communications manager 1115 may be an example of aspects of a base station communications manager 1215 described with reference to FIGS. 9, 10, and 12. The base station communications manager 1115 may include resource component 1120, configuration component 1125, physical channel component 1130, and parameter component 1135. Each of these modules may communicate, directly or indirectly, with one another (e.g., via one or more buses).

Resource component 1120 may identify time and frequency resources for a PDSCH to transmit to a UE in a first TTI. Configuration component 1125 may transmit, to the UE, configuration information for a control channel search space set in a second TTI. The second TTI preceding the first TTI, and the configuration information including an indication of an absence of a PDCCH transmission to be sent in the control channel search space set to indicate the identified time and frequency resources for the PDSCH, and a set of time and frequency resources for the control channel search space set. Configuration component 1125 may transmit the configuration information for the control channel search space set using RRC signaling. In some cases, the configuration information includes a coreset configuration, a TCI state, and the time and frequency resources corresponding to resources of the coreset configuration. In some cases, the control channel search space set associated with the coreset contains a zero number of PDCCH candidates.

Physical channel component 1130 may transmit a PDSCH transmission in a first TCI state in a field of a DCI. Physical channel component 1130 may transmit the PDSCH transmission in the identified time and frequency resources using a beam associated with the transmitted TCI state, the transmission of the PDSCH based on a scheduling offset being greater than or equal to a threshold value. In other cases, physical channel component 1130 may transmit the PDSCH transmission in the identified time and frequency resources using a first beam associated with a second TCI state, and based on a scheduling offset of the PDSCH transmission being less than or equal to a threshold value. The first beam may be different from a second beam associated with the first TCI state, and the second TCI state of a control resource set associated with the control channel search space set. Parameter component 1135 may transmit, in a field of a DCI, a TCI state. The TCI state may include a spatial QCL parameter for a beam indication.

Figure 12:
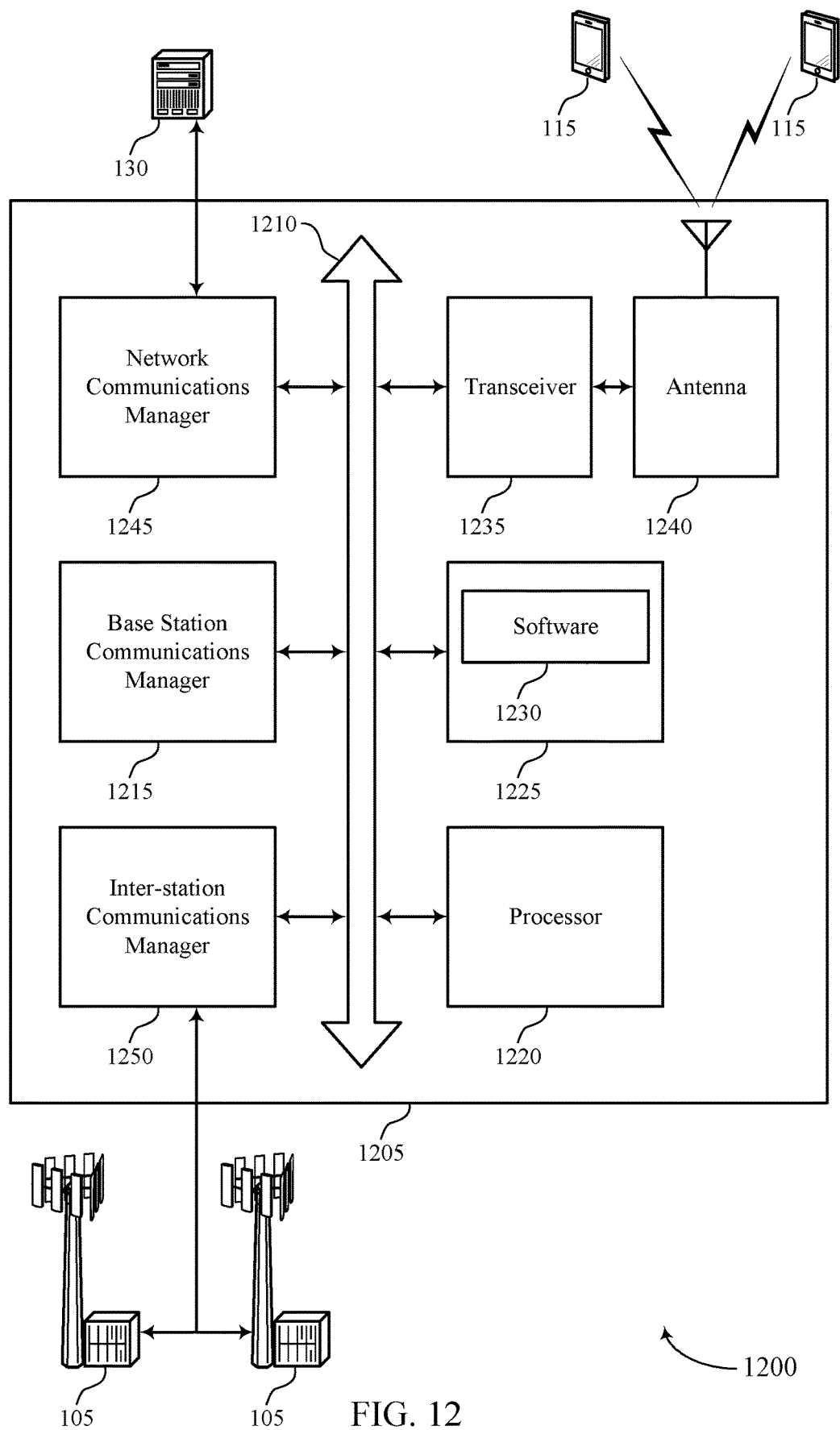
FIG. 12 illustrates a block diagram of a system including a base station that supports virtual search space sets for beam indication in accordance with aspects of the present disclosure.

FIG. 12 shows a diagram of a system 1200 including a device 1205 that supports virtual search space sets for beam indication in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting virtual search space sets for beam indication).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support virtual search space sets for beam indication. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
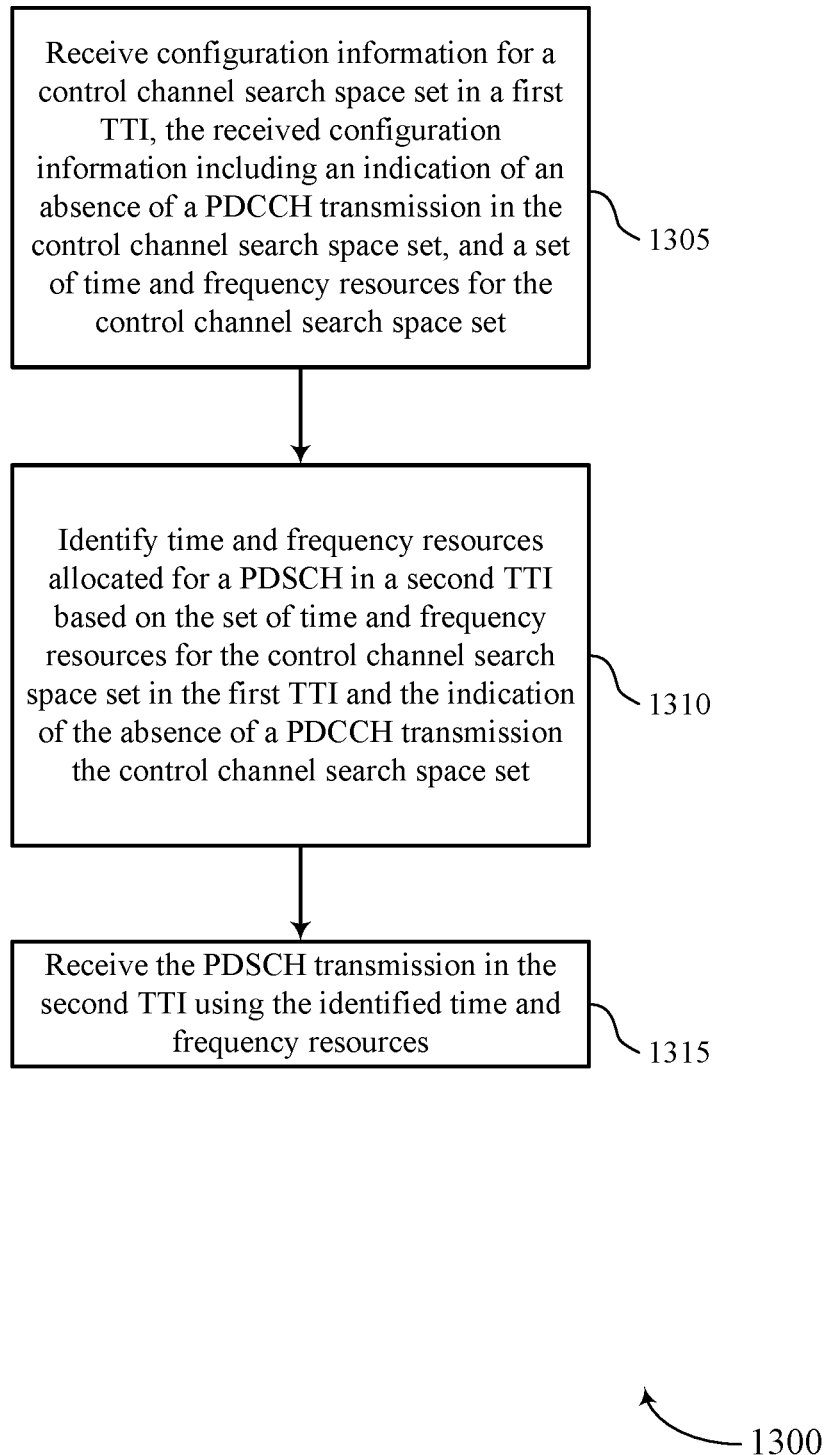
FIGS. 13 through 19 illustrate methods for virtual search space sets for beam indication in accordance with aspects of the present disclosure.

FIG. 13 shows a flowchart illustrating a method 1300 for virtual search space sets for beam indication in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive configuration information for a control channel search space set in a first TTI, the received configuration information containing an indication of an absence of a PDCCH transmission in the control channel search space set, and a set of time and frequency resources for the control channel search space set. The operations of 1305 may be performed according to the methods described herein. In certain examples, aspects of the operations of 1305 may be performed by a configuration component as described with reference to FIGS. 5 through 8.

At 1310 the UE 115 may identify time and frequency resources allocated for a PDSCH in a second TTI based at least in part on the set of time and frequency resources for the control channel search space set in the first TTI and the indication of the absence of a PDCCH transmission the control channel search space set. The operations of 1310 may be performed according to the methods described herein. In certain examples, aspects of the operations of 1310 may be performed by a resource component as described with reference to FIGS. 5 through 8.

At 1315 the UE 115 may receive a PDSCH transmission in the second TTI using the identified time and frequency resources. The operations of 1315 may be performed according to the methods described herein. In certain examples, aspects of the operations of 1315 may be performed by a physical channel component as described with reference to FIGS. 5 through 8.

Figure 14:
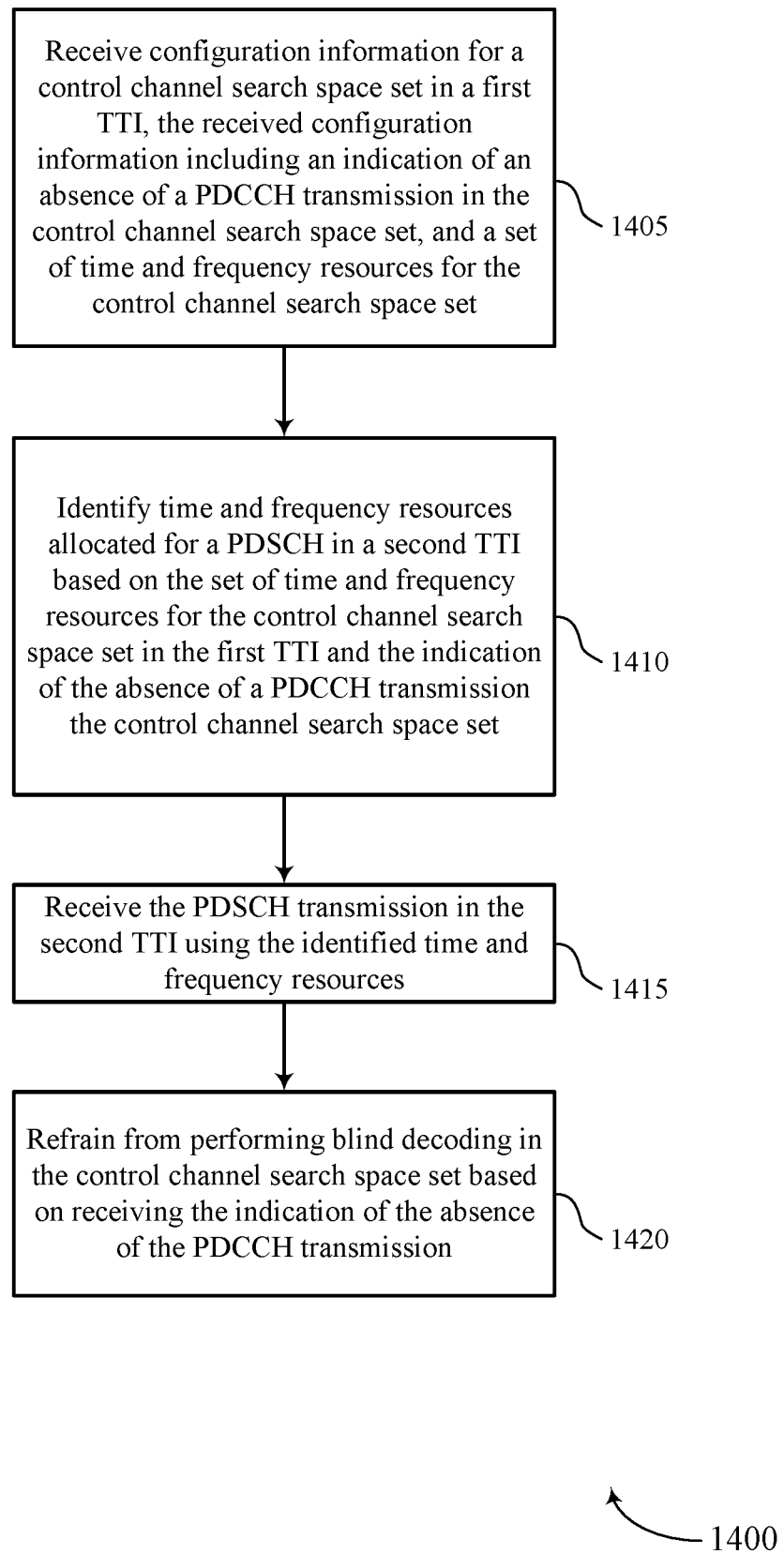

FIG. 14 shows a flowchart illustrating a method 1400 for virtual search space sets for beam indication in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive configuration information for a control channel search space set in a first TTI, the received configuration information containing an indication of an absence of a PDCCH transmission in the control channel search space set, and a set of time and frequency resources for the control channel search space set. The operations of 1405 may be performed according to the methods described herein. In certain examples, aspects of the operations of 1405 may be performed by a configuration component as described with reference to FIGS. 5 through 8.

At 1410 the UE 115 may identify time and frequency resources allocated for a PDSCH in a second TTI based at least in part on the set of time and frequency resources for the control channel search space set in the first TTI and the indication of the absence of a PDCCH transmission the control channel search space set. The operations of 1410 may be performed according to the methods described herein. In certain examples, aspects of the operations of 1410 may be performed by a resource component as described with reference to FIGS. 5 through 8.

At 1415 the UE 115 may receive a PDSCH transmission in the second TTI using the identified time and frequency resources. The operations of 1415 may be performed according to the methods described herein. In certain examples, aspects of the operations of 1315 may be performed by a physical channel component as described with reference to FIGS. 5 through 8.

At 1420 the UE 115 may refrain from performing blind decoding in the control channel search space set based at least in part on receiving the indication of the absence of the PDCCH transmission. The operations of 1420 may be performed according to the methods described herein. In certain examples, aspects of the operations of 1420 may be performed by a decoding component as described with reference to FIGS. 5 through 8.

Figure 15:
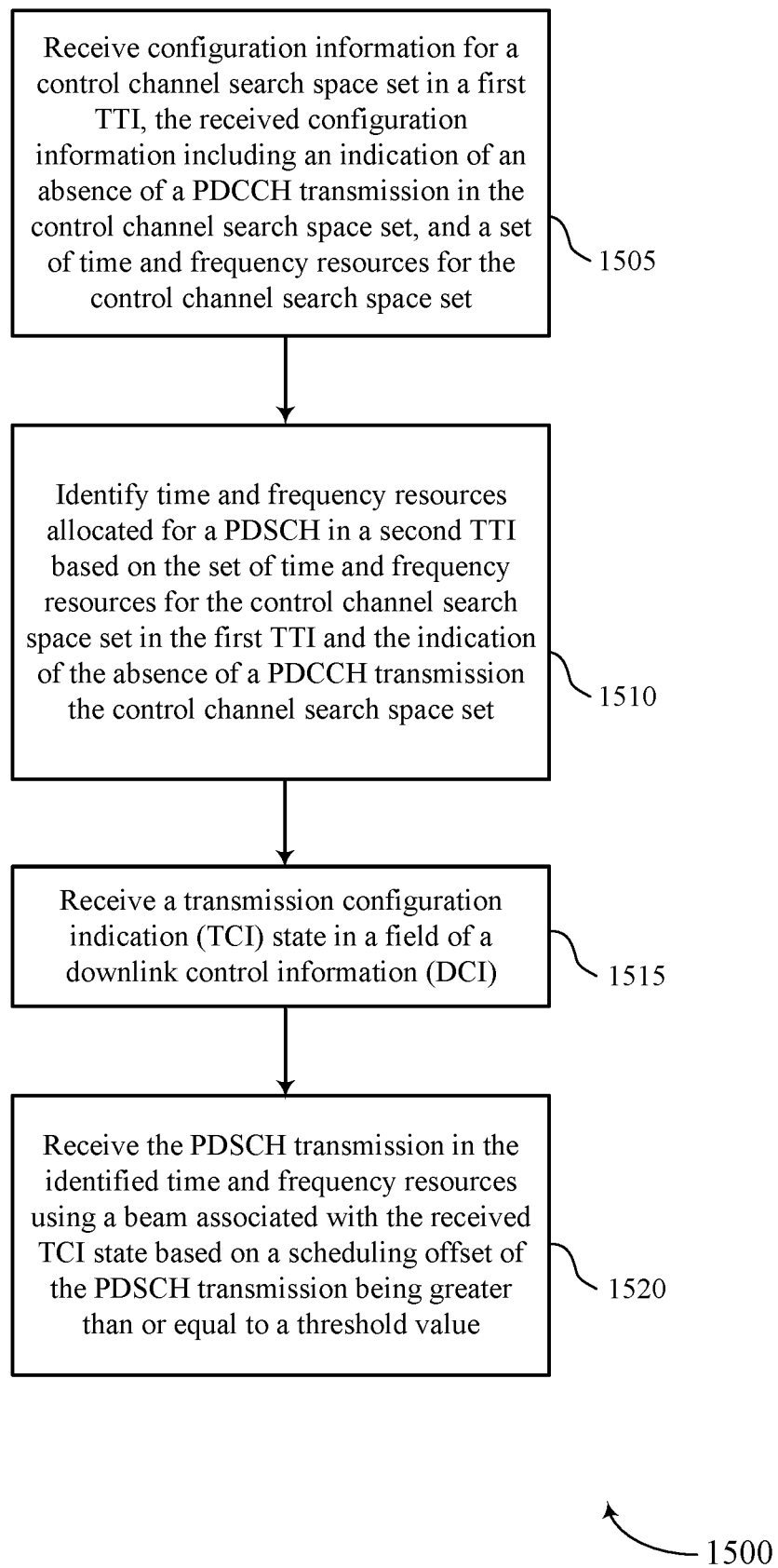

FIG. 15 shows a flowchart illustrating a method 1500 for virtual search space sets for beam indication in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive configuration information for a control channel search space set in a first TTI, the received configuration information containing an indication of an absence of a PDCCH transmission in the control channel search space set, and a set of time and frequency resources for the control channel search space set. The operations of 1505 may be performed according to the methods described herein. In certain examples, aspects of the operations of 1505 may be performed by a configuration component as described with reference to FIGS. 5 through 8.

At 1510 the UE 115 may identify time and frequency resources allocated for a PDSCH in a second TTI based on the set of time and frequency resources for the control channel search space set in the first TTI and the indication of the absence of a PDCCH transmission the control channel search space set. The operations of 1510 may be performed according to the methods described herein. In certain examples, aspects of the operations of 1510 may be performed by a resource component as described with reference to FIGS. 5 through 8.

At 1515 the UE 115 may receive a TCI state in a field of a DCI. The operations of 1515 may be performed according to the methods described herein. In certain examples, aspects of the operations of 1515 may be performed by a physical channel component as described with reference to FIGS. 5 through 8

At 1520 the UE 115 may receive the PDSCH transmission in the identified time and frequency resources using a beam associated with the received TCI state based on a scheduling offset of the PDSCH transmission being greater than or equal to a threshold value. The operations of 1520 may be performed according to the methods described herein. In certain examples, aspects of the operations of 1520 may be performed by a physical channel component as described with reference to FIGS. 5 through 8.

Figure 16:
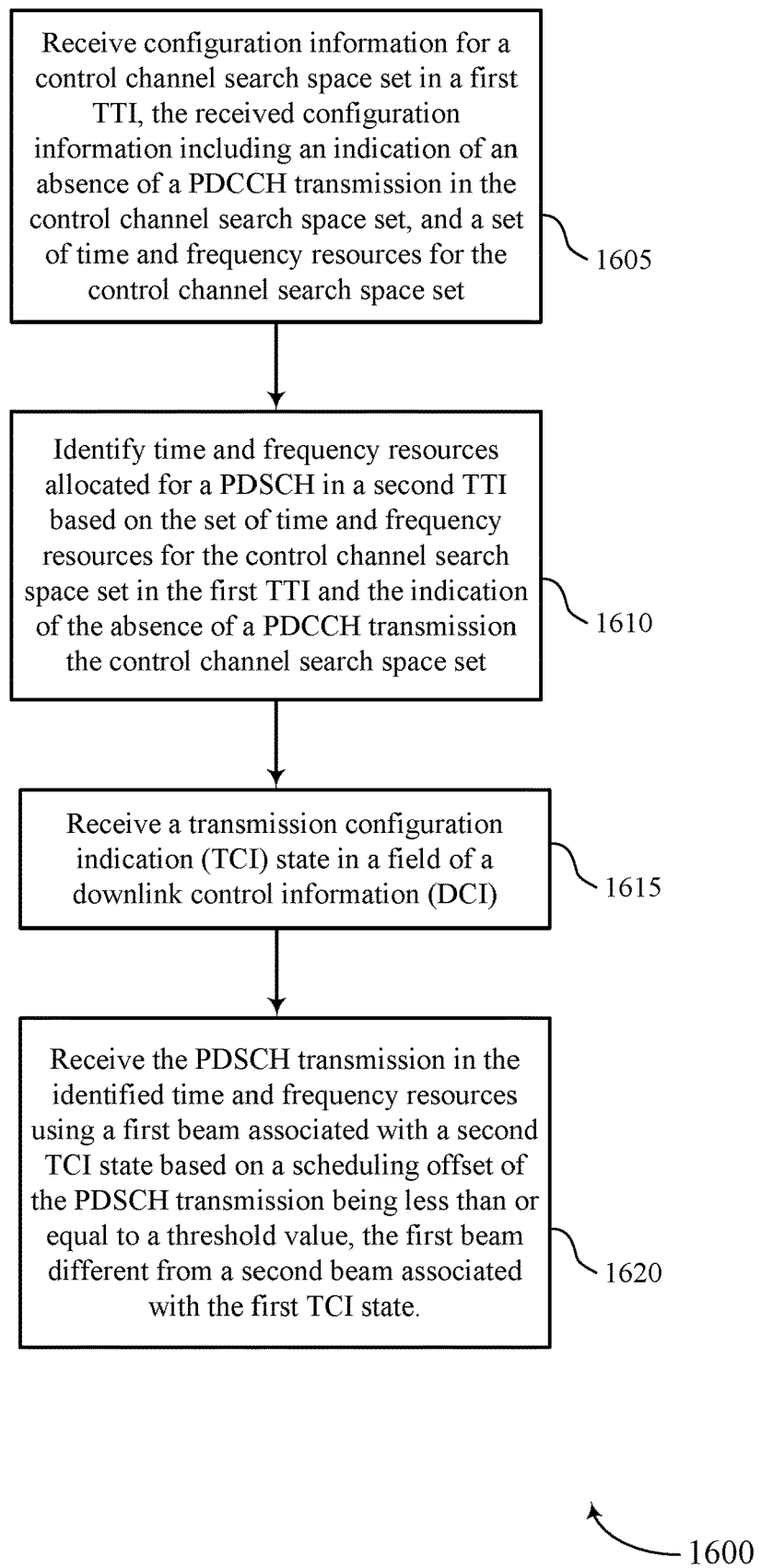

FIG. 16 shows a flowchart illustrating a method 1600 for virtual search space sets for beam indication in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive configuration information for a control channel search space set in a first TTI, the received configuration information containing an indication of an absence of a PDCCH transmission in the control channel search space set, and a set of time and frequency resources for the control channel search space set. The operations of 1605 may be performed according to the methods described herein. In certain examples, aspects of the operations of 1605 may be performed by a configuration component as described with reference to FIGS. 5 through 8.

At 1610 the UE 115 may identify time and frequency resources allocated for a PDSCH in a second TTI based on the set of time and frequency resources for the control channel search space set in the first TTI and the indication of the absence of a PDCCH transmission the control channel search space set. The operations of 1610 may be performed according to the methods described herein. In certain examples, aspects of the operations of 1610 may be performed by a resource component as described with reference to FIGS. 5 through 8.

At 1615 the UE 115 may receive a TCI state in a field of a DCI. The operations of 1615 may be performed according to the methods described herein. In certain examples, aspects of the operations of 1615 may be performed by a physical channel component as described with reference to FIGS. 5 through 8

At 1620 the UE 115 may receive the PDSCH transmission in the identified time and frequency resources using a first beam associated with a second TCI state based on a scheduling offset of the PDSCH transmission being less than or equal to a threshold value, the first beam different from a second beam associated with the first TCI state, and the second TCI state of a control resource set associated with the control channel search space set. The operations of 1620 may be performed according to the methods described herein. In certain examples, aspects of the operations of 1620 may be performed by a physical channel component as described with reference to FIGS. 5 through 8.

Figure 17:
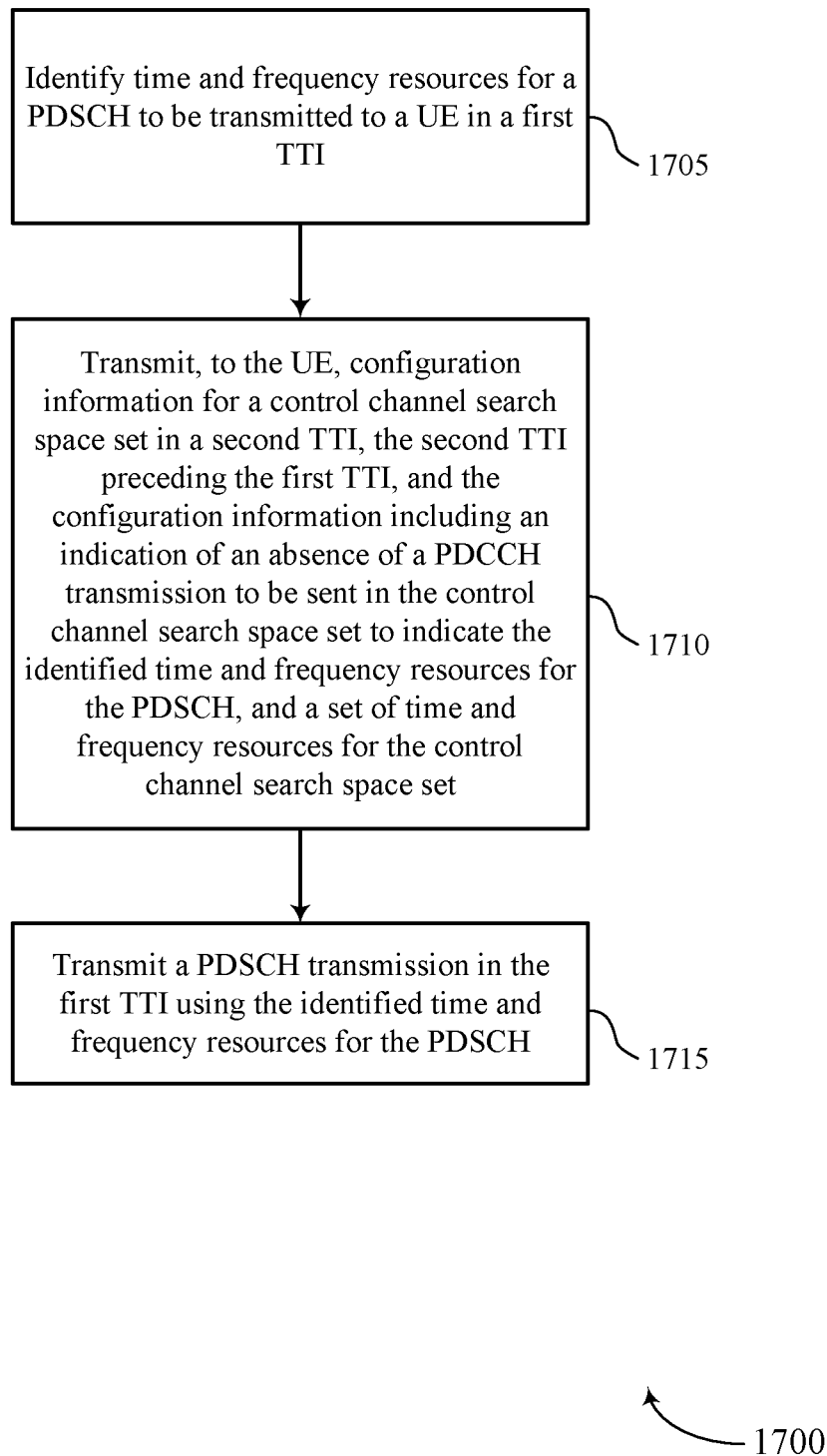

FIG. 17 shows a flowchart illustrating a method 1700 for virtual search space sets for beam indication in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may identify time and frequency resources for a PDSCH to be transmitted to a UE in a first TTI. The operations of 1605 may be performed according to the methods described herein. In certain examples, aspects of the operations of 1605 may be performed by a resource component as described with reference to FIGS. 9 through 12.

At 1710 the base station 105 may transmit, to the UE, configuration information for a control channel search space set in a second TTI, the second TTI preceding the first TTI, and the configuration information containing an indication of an absence of a PDCCH transmission to be sent in the control channel search space set to indicate the identified time and frequency resources for the PDSCH, and a set of time and frequency resources for the control channel search space set. The operations of 1710 may be performed according to the methods described herein. In certain examples, aspects of the operations of 1710 may be performed by a configuration component as described with reference to FIGS. 9 through 12.

At 1715 the base station 105 may transmit a PDSCH transmission in the first TTI using the identified time and frequency resources for the PDSCH. The operations of 1715 may be performed according to the methods described herein. In certain examples, aspects of the operations of 1715 may be performed by a physical channel component as described with reference to FIGS. 9 through 12.

Figure 18:
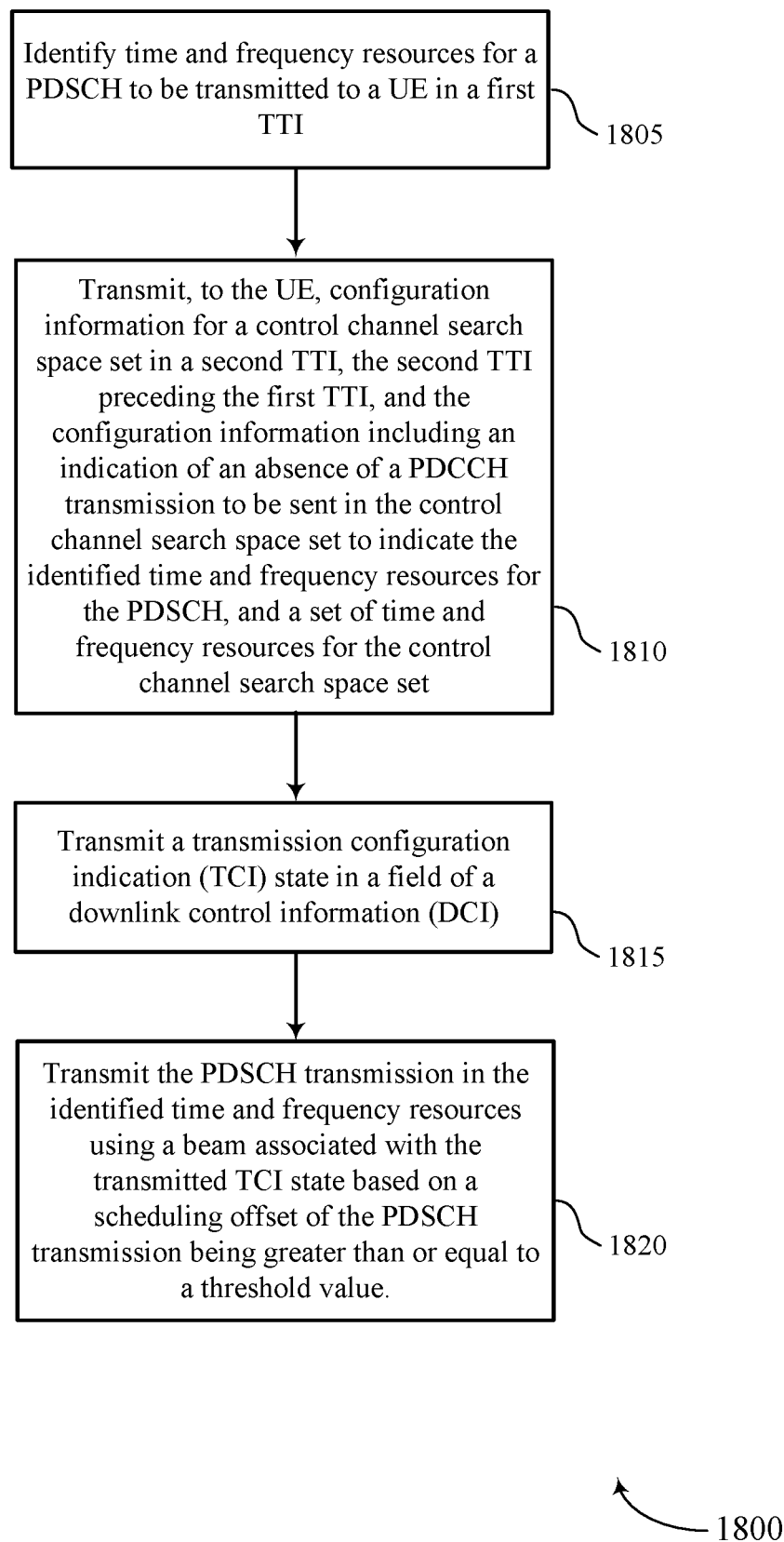

FIG. 18 shows a flowchart illustrating a method 1800 for virtual search space sets for beam indication in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may identify time and frequency resources for a PDSCH to be transmitted to a UE in a first TTI. The operations of 1805 may be performed according to the methods described herein. In certain examples, aspects of the operations of 1805 may be performed by a resource component as described with reference to FIGS. 9 through 12.

At 1810 the base station 105 may transmit, to the UE, configuration information for a control channel search space set in a second TTI, the second TTI preceding the first TTI, and the configuration information containing an indication of an absence of a PDCCH transmission to be sent in the control channel search space set to indicate the identified time and frequency resources for the PDSCH, and a set of time and frequency resources for the control channel search space set. The operations of 1810 may be performed according to the methods described herein. In certain examples, aspects of the operations of 1810 may be performed by a configuration component as described with reference to FIGS. 9 through 12.

At 1815, the base station 105 may transmit a TCI state in a field of a DCI. The operations of 1815 may be performed according to the methods described herein. In certain examples, aspects of the operations of 1815 may be performed by a physical channel component as described with reference to FIGS. 9 through 12.

At 1820 the base station 105 may transmit the PDSCH transmission in the identified time and frequency resources using a beam associated with the transmitted TCI state based on a scheduling offset of the PDSCH transmission being greater than or equal to a threshold value. The operations of 1820 may be performed according to the methods described herein. In certain examples, aspects of the operations of 1820 may be performed by a physical channel component as described with reference to FIGS. 9 through 12.

Figure 19:
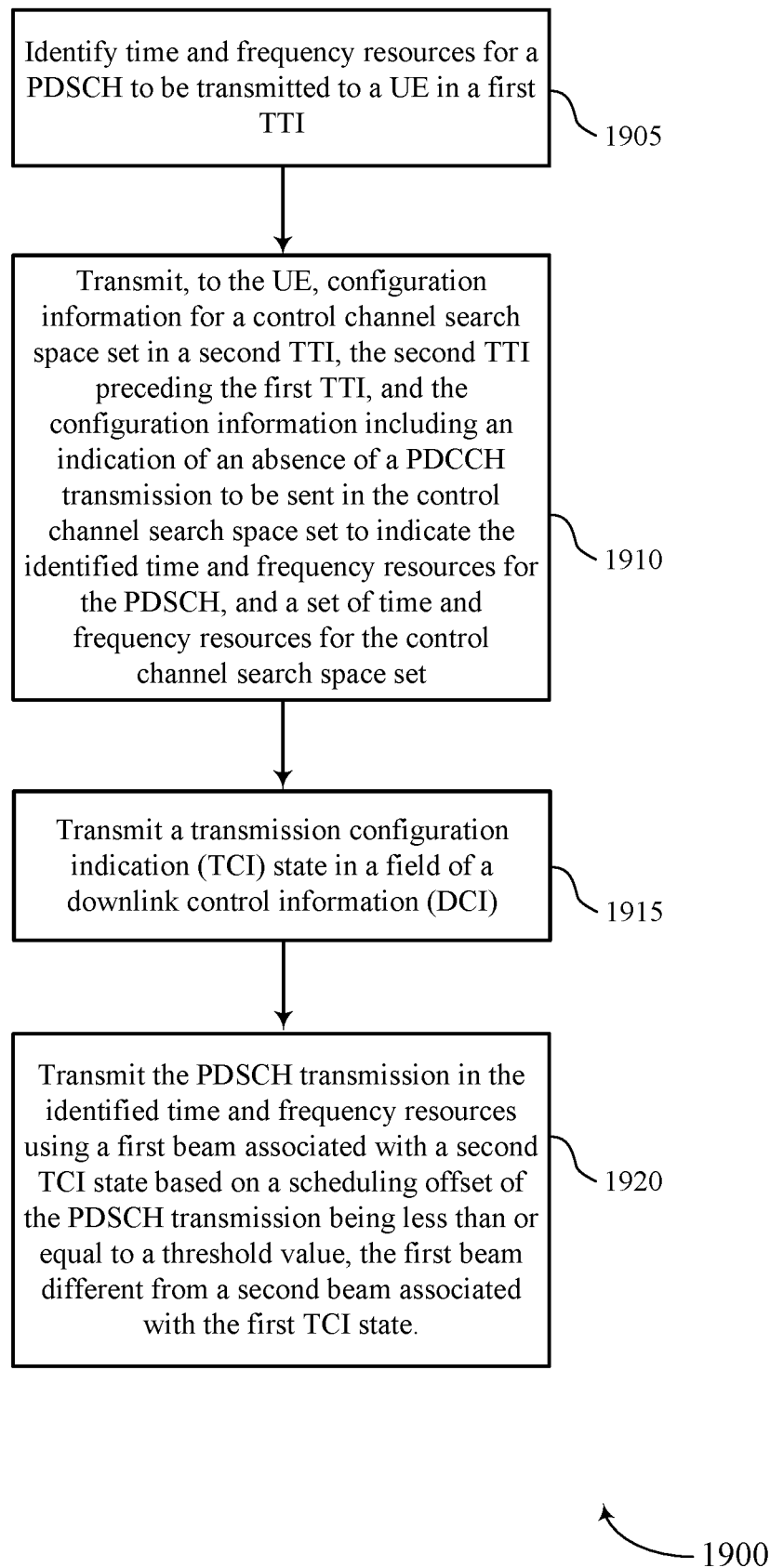

FIG. 19 shows a flowchart illustrating a method 1900 for virtual search space sets for beam indication in accordance with aspects of the present disclosure. The operations of method 1900 may be implemented by a base station 105 or its components as described herein. For example, the operations of method 1900 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may identify time and frequency resources for a PDSCH to be transmitted to a UE in a first TTI. The operations of 1905 may be performed according to the methods described herein. In certain examples, aspects of the operations of 1905 may be performed by a resource component as described with reference to FIGS. 9 through 12.

At 1910 the base station 105 may transmit, to the UE, configuration information for a control channel search space set in a second TTI, the second TTI preceding the first TTI, and the configuration information containing an indication of an absence of a PDCCH transmission to be sent in the control channel search space set to indicate the identified time and frequency resources for the PDSCH, and a set of time and frequency resources for the control channel search space set. The operations of 1910 may be performed according to the methods described herein. In certain examples, aspects of the operations of 1810 may be performed by a configuration component as described with reference to FIGS. 9 through 12.

At 1915 the base station 105 may transmit a TCI state in a field of a DCI. The operations of 1915 may be performed according to the methods described herein. In certain examples, aspects of the operations of 1915 may be performed by a physical channel component as described with reference to FIGS. 9 through 12.

At 1920 the base station 105 may transmit the PDSCH transmission in the identified time and frequency resources using a first beam associated with a second TCI state based on a scheduling offset of the PDSCH transmission being less than or equal to a threshold value, the first beam different from a second beam associated with the first TCI state, and the second TCI state of a control resource set associated with the control channel search space set. The operations of 1920 may be performed according to the methods described herein. In certain examples, aspects of the operations of 1920 may be performed by a physical channel component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
   identifying time and frequency resources for a physical downlink shared channel (PDSCH) to be transmitted to a user equipment (UE) in a first transmission time interval (TTI);
   transmitting, to the UE, configuration information for a control channel search space set in a second TTI, the second TTI preceding the first TTI, and the configuration information comprising an indication of an absence of a physical downlink control channel (PDCCH) transmission to be sent in the control channel search space set to indicate the identified time and frequency resources for the PDSCH, and a set of time and frequency resources for the control channel search space set; and
   transmitting a PDSCH transmission in the first TTI using the identified time and frequency resources for the PDSCH.

2. The method of claim 1, further comprising:
   transmitting the configuration information for the control channel search space set using radio resource control signaling.

3. The method of claim 1, wherein the configuration information comprises a control resource set configuration, a transmission configuration indication (TCI) state, and the time and frequency resources corresponding to resources of the control resource set configuration.

4. The method of claim 1, further comprising:
   transmitting, in a field of a downlink control information (DCI), a transmission configuration indication (TCI) state, wherein the TCI state comprises a spatial quasi-collocation (QCL) parameter for a beam indication.

5. The method of claim 1, further comprising:
   transmitting, in a field of a downlink control information (DCI), a transmission configuration indication (TCI) state; and
   transmitting, based at least in part on a scheduling offset of the PDSCH transmission being greater than or equal to a threshold value, the PDSCH transmission in the identified time and frequency resources using a beam associated with the transmitted TCI state.

6. The method of claim 1, further comprising:
   transmitting, in a field of a downlink control information (DCI), a first transmission configuration indication (TCI) state; and
   transmitting, based at least in part on a scheduling offset of the PDSCH transmission being less than or equal to a threshold value, the PDSCH transmission in the identified time and frequency resources using a first beam associated with a second TCI state, the first beam different from a second beam associated with the first TCI state, and the second TCI state of a control resource set associated with the control channel search space set.

7. The method of claim 1, wherein the control channel search space set associated with a control resource set comprises a zero number of PDCCH candidates.

8. An apparatus for wireless communication, comprising:
   means for identifying time and frequency resources for a physical downlink shared channel (PDSCH) to be transmitted to a user equipment (UE) in a first transmission time interval (TTI);
   means for transmitting, to the UE, configuration information for a control channel search space set in a second TTI, the second TTI preceding the first TTI, and the configuration information comprising an indication of an absence of a physical downlink control channel (PDCCH) transmission to be sent in the control channel search space set to indicate the identified time and frequency resources for the PDSCH, and a set of time and frequency resources for the control channel search space set; and
   means for transmitting a PDSCH transmission in the first TTI using the identified time and frequency resources for the PDSCH.

9. The apparatus of claim 8, further comprising:
   means for transmitting the configuration information for the control channel search space set using radio resource control signaling.

10. The apparatus of claim 8, further comprising:
    means for transmitting, in a field of a downlink control information (DCI), a transmission configuration indication (TCI) state, wherein the TCI state comprises a spatial quasi-collocation (QCL) parameter for a beam indication.

11. The apparatus of claim 8, further comprising:
    means for transmitting the PDSCH transmission in the first TTI using a beam corresponding to the identified time and frequency resources based at least in part on a scheduling offset of the PDSCH transmission being greater than or equal to a threshold value.

12. The apparatus of claim 8, further comprising:
    means for transmitting the PDSCH transmission in the first TTI using a first beam based at least in part on a scheduling offset of the PDSCH transmission being less than or equal to a threshold value, the first beam different from a second beam corresponding to the identified time and frequency resources.

13. An apparatus for wireless communication, comprising:
    a processor;
    memory in electronic communication with the processor; and
    instructions stored in the memory and executable by the processor to cause the apparatus to:
    identify time and frequency resources for a physical downlink shared channel (PDSCH) to be transmitted to a user equipment (UE) in a first transmission time interval (TTI);
    transmit, to the UE, configuration information for a control channel search space set in a second TTI, the second TTI preceding the first TTI, and the configuration information comprising an indication of an absence of a physical downlink control channel (PDCCH) transmission to be sent in the control channel search space set to indicate the identified time and frequency resources for the PDSCH, and a set of time and frequency resources for the control channel search space set; and transmit a PDSCH transmission in the first TTI using the identified time and frequency resources for the PDSCH.

14. The apparatus of claim 13, wherein the instructions are further executable by the processor to cause the apparatus to:
transmit the configuration information for the control channel search space set using radio resource control signaling.

15. The apparatus of claim 13, wherein the configuration information comprises a control resource set configuration, a transmission configuration indication (TCI) state, and the time and frequency resources corresponding to resources of the control resource set configuration.

16. The apparatus of claim 13, wherein the instructions are further executable by the processor to cause the apparatus to:
transmit, in a field of a downlink control information (DCI), a transmission configuration indication (TCI) state, wherein the TCI state comprises a spatial quasi-collocation (QCL) parameter for a beam indication.

17. The apparatus of claim 13, wherein the instructions are further executable by the processor to cause the apparatus to:
transmit, in a field of a downlink control information (DCI), a transmission configuration indication (TCI) state; and
transmit, based at least in part on a scheduling offset of the PDSCH transmission being greater than or equal to a threshold value, the PDSCH transmission in the identified time and frequency resources using a beam associated with the transmitted TCI state.

18. The apparatus of claim 13, wherein the instructions are further executable by the processor to cause the apparatus to:
transmit, in a field of a downlink control information (DCI), a first transmission configuration indication (TCI) state; and
transmit, based at least in part on a scheduling offset of the PDSCH transmission being less than or equal to a threshold value, the PDSCH transmission in the identified time and frequency resources using a first beam associated with a second TCI state, the first beam different from a second beam associated with the first TCI state, and the second TCI state of a control resource set associated with the control channel search space set.

19. The apparatus of claim 13, wherein the control channel search space set associated with a control resource set comprises a zero number of PDCCH candidates.

20. A non-transitory computer-readable medium storing code for wireless communication, the code comprising instructions executable by a processor to:
identify time and frequency resources for a physical downlink shared channel (PDSCH) to be transmitted to a user equipment (UE) in a first transmission time interval (TTI);
transmit, to the UE, configuration information for a control channel search space set in a second TTI, the second TTI preceding the first TTI, and the configuration information comprising an indication of an absence of a physical downlink control channel (PDCCH) transmission to be sent in the control channel search space set to indicate the identified time and frequency resources for the PDSCH, and a set of time and frequency resources for the control channel search space set; and
transmit a PDSCH transmission in the first TTI using the identified time and frequency resources for the PDSCH.

21. The non-transitory computer-readable medium of claim 20, wherein the instructions are further executable to:
transmit the configuration information for the control channel search space set using radio resource control signaling.

22. The non-transitory computer-readable medium of claim 20, wherein the configuration information comprises a control resource set configuration, a transmission configuration indication (TCI) state, and the time and frequency resources corresponding to resources of the control resource set configuration.

23. The non-transitory computer-readable medium of claim 20, wherein the instructions are further executable to:
transmit, in a field of a downlink control information (DCI), a transmission configuration indication (TCI) state, wherein the TCI state comprises a spatial quasi-collocation (QCL) parameter for a beam indication.

24. The non-transitory computer-readable medium of claim 20, wherein the instructions are further executable to:
transmit, in a field of a downlink control information (DCI), a transmission configuration indication (TCI) state; and
transmit, based at least in part on a scheduling offset of the PDSCH transmission being greater than or equal to a threshold value, the PDSCH transmission in the identified time and frequency resources using a beam associated with the transmitted TCI state.

25. The non-transitory computer-readable medium of claim 20, wherein the instructions are further executable to:
transmit, in a field of a downlink control information (DCI), a first transmission configuration indication (TCI) state; and
transmit, based at least in part on a scheduling offset of the PDSCH transmission being less than or equal to a threshold value, the PDSCH transmission in the identified time and frequency resources using a first beam associated with a second TCI state, the first beam different from a second beam associated with the first TCI state, and the second TCI state of a control resource set associated with the control channel search space set.

26. The non-transitory computer-readable medium of claim 20, wherein the control channel search space set associated with a control resource set comprises a zero number of PDCCH candidates.

* * * * *